US008147324B2

(12) United States Patent
Mothwurf et al.

(10) Patent No.: US 8,147,324 B2
(45) Date of Patent: Apr. 3, 2012

(54) GAMING MACHINE WITH HIDDEN JACKPOT

(75) Inventors: Ewald Mothwurf, Graz (AT); Peter Lang, Graz (AT); Franz Lechner, Graz (AT); Dominik Berger, Graz (AT)

(73) Assignee: Spielo International Austria GmbH, Lübbecke (DE)

( * ) Notice: Subject to any disclaimer, the term of this patent is extended or adjusted under 35 U.S.C. 154(b) by 2171 days.

(21) Appl. No.: 10/991,308

(22) Filed: Nov. 16, 2004

(65) Prior Publication Data

US 2005/0070356 A1 Mar. 31, 2005

Related U.S. Application Data

(60) Continuation of application No. 10/782,590, filed on Feb. 18, 2004, which is a division of application No. 09/761,439, filed on Jan. 16, 2001, now Pat. No. 6,712,695.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. ................. 463/26; 463/25; 463/27; 463/28

(58) Field of Classification Search ............... 463/26–28
See application file for complete search history.

(56) References Cited

U.S. PATENT DOCUMENTS

| | | | | |
|---|---|---|---|---|
| 4,837,728 | A | 6/1989 | Barrie et al. | |
| 5,042,810 | A | 8/1991 | Williams | |
| 5,116,055 | A | 5/1992 | Tracy | |
| 5,275,400 | A | 1/1994 | Weingardt et al. | |
| 5,280,909 | A * | 1/1994 | Tracy | 463/27 |
| 6,089,980 | A * | 7/2000 | Gauselmann | 463/27 |
| 6,146,273 | A * | 11/2000 | Olsen | 463/27 |
| 6,210,275 | B1 | 4/2001 | Olsen | |
| 6,565,434 | B1 | 5/2003 | Acres | |
| 6,712,695 | B2 | 3/2004 | Mothwurf et al. | |
| 6,918,834 | B2 * | 7/2005 | Vancura | 463/25 |
| 2003/0211884 | A1 * | 11/2003 | Gauselmann | 463/26 |

* cited by examiner

*Primary Examiner* — Dmitry Suhol
*Assistant Examiner* — Kevin Y Kim
(74) *Attorney, Agent, or Firm* — Patent Law Group LLP; Brian D. Ogonowsky

(57) ABSTRACT

Various type of jackpot systems are disclosed wherein visible jackpots are replenished after a win by an invisible jackpot. Some embodiments include: replenishing the visible jackpot with less than 100% of the invisible jackpot; increasing the invisible jackpot at a rate faster than the rate at which the visible jackpot is increased; having a criteria for a win of the jackpot based on the amount of the invisible jackpot; and using multiple visible and invisible jackpots in various ways.

19 Claims, 11 Drawing Sheets

REPLACEMENT SHEET

JACKPOTS & ADVANCED BONUSING SYSTEMS

JACKPOT ENGINE OPERATES WITHOUT THE NEED FOR A DEDICATED HARDWARE CONTROLLER. THE ETHERNET DIRECT CONNECTION TO ALL SLOT MACHINES IS THE PERFECT BASE FOR INTERGRATED JACKPOTS. STANDARD LOCAL & WIDE AREA PROGRESSIVES AND LOCAL & WIDE AREA RANDOM HIT JACKPOTS CAN BE EASILY CONFIGURED. NEW TYPES OF JACKPOT AND BONUSING EVENTS CAN BE DESIGNED USING ALTERNATIVE CONFIGURATIONS.

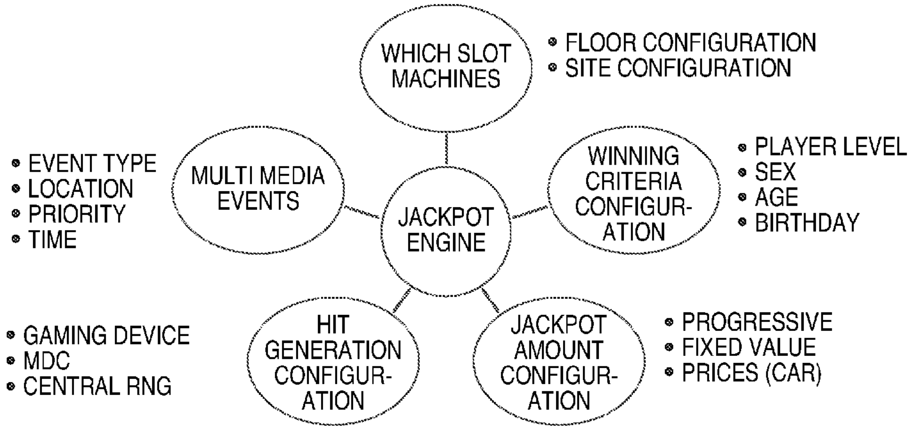

INTEGRATED SYSTEM

- JACKPOT AND BONUSING SYSTEM COMBINED
- ACCOUNTING AND PLAYER TRACKING HARDWARE REPLACES SEPARATE CONTROLLERS
- NO IP CONTROLLER HARDWARE NECESSARY

JACKPOTS EASILY CONFIGURED

- ALL STANDARD IP TYPES CAN BE CONFIGURED:
  - LOCAL AREA PROGRESSIVES
  - RANDOM HIT JACKPOTS
  - WIDE AREA PROGRESSIVES

NEW CONFIGURATIONS POSSIBLE

- INTEGRATED APPROACH ALLOWS LARGE VARIETY OF CONFIGURATIONS
- CONFIGURE ADVANCED JACKPOTS FOR PROMOTIONAL PURPOSES
- ACTIVATE PLAYER ATTRIBUTES
- INTRODUCE NEW IP CONCEPTS:
  - E.G. GOLDEN LADIES (WINNING CRITERIA GOLD CARD MEMBER + AND FEMALE)

FIG. 11

GAMING MACHINE WITH HIDDEN JACKPOT

CROSS-REFERENCE TO RELATED APPLICATIONS

This application is a continuation of pending U.S. application Ser. No. 10/782,590, filed Feb. 18, 2004, which is a divisional of U.S. application Ser. No. 09/761,439, filed Jan. 16, 2001, now U.S. Pat. No. 6,712,695, all incorporated herein by reference.

FIELD OF THE INVENTION

The present invention relates to a jackpot system for use in a casino for the allocation of wins from at least one jackpot to players playing at a plurality of gaming positions and to a method of operating such a jackpot system.

BACKGROUND

The use of jackpot systems in casinos is well known. The underlying idea is for the casino to pay a proportion of the amount bet by at least some players into a jackpot which can then be won by a player in accordance with various different systems. Although the payment of a contribution from the amount bet by the player into a jackpot initially represents a loss of profit to the casino, casinos are nevertheless keen to use such jackpot systems, because they encourage players to participate in games of chance, at slot machines and/or at gaming tables and thus increase the total turnover of the casino. Since the profit made in a well-run casino is a well controlled percentage of the total amounts bet, i.e. of the turnover, most casinos consider it advantageous to operate a jackpot system, since this increases their turnover and thus their profits, despite the investment the casino has to make in funding and running the jackpot system.

A typical jackpot system will start off with an initial sum of money, say US $100,000. The total amount of the jackpot will increase each time a bet is made by a player, with, for example, a series of illuminated displays showing the total value of the jackpot to the players so that they can follow the increase in value. It is usual for the casino to operate a so-called backup account. This means that a proportion of the money which is allocated for the jackpot system, is branched off into the backup account rather than allocating it all to the actual jackpot, so that once the jackpot has been won it can be restarted from the backup account at a reasonable initial level, say, for example, US $100,000. Systems are known in which the amount of money split off into the backup account is increased as the actual jackpot increases, so that the jackpot rises less quickly once a higher level has been reached. This can be done for a variety of reasons, such as financial considerations by the casino management and to avoid a very high jackpot appearing unattractive to the players, because they sense that the rules for winning the jackpot are too strict.

In order to maximize the attraction of a jackpot, it is also frequently the case that two or more casinos belonging to a chain are interlinked so that each casino makes a contribution to the jackpot of the other casino. This contribution is referred to as "the offset" in casino language.

Typically the rules for operating a jackpot system are fixed and the casino has only relatively few opportunities for varying the rules.

Various different types of jackpot system are known, such as a mystery jackpot, a progressive jackpot and a mystery progressive jackpot. For example, in a mystery jackpot system, minimum and maximum levels will be defined for the jackpot, for example a minimum level of US $10,000 and a maximum level of US $50,000, or, in another example, a minimum level of US $100,000 and a maximum level of US $1,000,000. A random number generator then operates to generate a random number in the range between the minimum and maximum levels. The first game played which increases the jackpot to the threshold determined by the random number generator results in the player at the respective machine winning the jackpot.

Another form of jackpot system is described in U.S. Pat. No. 5,752,882. A yet further jackpot system is known from U.S. Pat. No. 5,741,183.

One system which is in operation in casinos and which enables one of the standard jackpot systems to be operated is the Crystal Web system from the assignees in respect of the present application, i.e. the company GRIPS Electronic Gesellschaft mbH of Niesenbergergasse 37, 8020 Graz, Austria. The basic layout of this system is shown in FIG. 1 of the present application. This system can also be adapted to operate in accordance with the present invention through the provision of suitable software, as will be described later herein.

The problem with all jackpot systems known hitherto is that they only provide the casino with a very restricted ability to modify the jackpot system to suit the casinos' particular needs and, in particular, do not give the casino the flexibility which, in accordance with the invention, is considered desirable to enable a casino to configure its jackpot system to meet its own operating goals, to reflect its pattern of business and to motivate sections of its clientele, who, for whatever reason, may not hitherto have been adequately motivated to participate in casino gaming activities.

SUMMARY

It is thus a prime object of the present invention to provide a jackpot system and a method of operating a jackpot system which enables the management of the casino to flexibly configure the jackpots it is using to reflect a whole variety of parameters and circumstances which are of relevance and interest to the casino management in maximizing its turnover and profit.

It is a further object of the present invention to present the casino management with choices for the configuration of jackpots in a way which is readily understood and easy to implement and which will increase the confidence of the casino management in the correctness of its choices.

Furthermore, it is an object of the present invention to provide a tool for the casino management by which the cost to it of a jackpot system can be readily quantified and a comparison made with the returns produced by the use of jackpot systems.

Moreover, it is an object of the present invention to provide a new way of motivating interest and an air of excitement in the casino by the staging of special events on an apparently random basis and to link these events to the jackpot system and to realize wins associated with the events using the jackpot system.

Moreover, it is a further object of the present invention to enable such events to be simulated so that the casino management can understand the cost to it of an event before running the event and, if necessary, can change the characteristics of the event to, for example, minimize cost while maximizing effect.

In order to satisfy these objects, there is provided, in accordance with a first aspect of the invention, a jackpot system for the allocation of wins from at least one jackpot to players playing at a plurality of gaming positions, wherein said gaming positions are associated with a computer network including a computing engine having a memory for receiving inputs from the gaming positions and at least one output for communicating information to said players, at least one paytable stored in said memory or in another memory associated with said computer network, said paytable being capable of being configured by an operator and having a plurality of possible winning entries and wins associated with said winning entries, a selection generator which is triggered at least once, via said computer network, by a trigger input generated in response to the playing of each game of a group of selected games, whereby to generate a selection, means for comparing the selection generated with the paytable, and, in the event of the selection generated corresponding to a said winning entry, initiating the transfer of the associated win to at least one player associated with the gaming position which triggered the selection, and/or to another jackpot.

Viewed another way there is provided, in accordance with the present invention, a jackpot system for the allocation of wins from at least one jackpot to players playing at a plurality of gaming positions, wherein said gaming positions are associated with a computer network including a centralized or distributed computing engine having a means for receiving, storing and processing inputs from the gaming positions and at least one output for communicating information to said players, at least one parameterizable win determination unit including at least one associated game of chance having rules and parameters relating to the rules and associated wins, said parameters being stored in said storage means, or in another storage means associated with said computer network, said win determination unit being capable of triggering play at said game of chance for each corresponding trigger input either from a unit associated with a gaming position or from a central unit to generate a result and a comparator for comparing the result generated with the rules of the game, and, in the event of the result generated corresponding to a winning result, initiating the transfer of the associated win to one or more players at or associated with the gaming position which triggered the winning result, and/or to another jackpot.

In particular the jackpot system preferably also includes means for varying the selection criteria and the wins associated with winning entries in accordance with operator determined inputs.

A jackpot system of the above kind thus enables the casino management to configure a jackpot system in accordance with a whole variety of criteria which it specifies.

First of all, the casino management has the opportunity to determine which items of information from the gaming positions shall serve as inputs to the jackpot system. These inputs from said gaming positions can, for example, comprise at least one of the following items of information:

- a value related to the amount bet at each game at the gaming position,
- information relating to the time at which each game is played,
- an indication of the identity of the gaming position (slot machines or positions at gaming tables or the gaming table itself),
- information relating to the geographical location of the gaming position,
- information relating to one or more player attributes such as the identity of the player (for example from player card) such as name, age, sex, member of group,
- player activity level (for example frequency of past visits, total turnover, turnover per visit, number of games per session, turnover per player session, time of player session, average bet per game),
- information on the type of game played,
- achievement of a specific win combination at the gaming position,
- information relating to an external event, such as a manual input from an operator or an input from another jackpot or jackpot system,
- information whether the gaming position is in operation,
- information on the number of patrons entering the casino and/or leaving the casino.

Moreover, the casino management is given the opportunity of configuring the outputs for communicating information to the players in accordance with its own concept and the jackpot system enables the casino management to flexibly define this concept. For example, the said at least one output for communicating information to said players can comprises at least one of the following:

- an output to one or more jackpot displays,
- an output to one or more multimedia devices (sound, light, television screen, smoke generator),
- outputs to displays or indicators (loudspeaker, vibrating seat) associated with one or more of said gaming positions.

Moreover, the jackpot system of the present invention provides the casino management with a very flexible tool for configuring the paytable. Thus, said entries in said paytable can comprise at least one of the following:

- a sequence of consecutive numbers each associated with a respective win or no win or with a plurality of like wins (for example an infinite or finite number of ten dollar payouts, or ten motorcars, or casino complementaries),
- a plurality of random numbers each associated with a respective win, or no win, or with a plurality of like wins,
- an indication of how many like wins associated with a winning entry are left (i.e. have not been allocated) if any,
- a plurality of dissimilar wins in a given sequence associated with one winning entry (for example nine small cars and one luxury car).

Thus, the jackpot system does not necessarily have to be confined to financial wins, but rather the jackpot can be configured by the casino management to conclude a whole variety of different wins which can, for example, comprise at least one of the following:

- a fixed sum of money,
- a sum of money related to a jackpot amount (for example via the size of the bet—higher bets usually lead to higher wins),
- a physical prize (for example motorcar, record player, cap, watch),
- a non-physical prize (for example holiday, theater ticket, airline ticket),
- casino complementary.

Thus, the jackpot system of the present invention provides the casino management with a wide degree of flexibility in configuring the wins associated with the jackpot.

The selection generator can be realized in a number of different ways. One possibility is for the selection generator to comprise a counter for counting the total number of trigger inputs generated in response to the playing of each game of a group of selected games and to use the selection generator in conjunction with a plurality of random numbers defining said winning entries in the paytable.

Thus, the counter is incremented each time a trigger input is received and when it reaches a number corresponding to a random number defining a winning entry, a jackpot win is triggered and the win associated with the winning entry is then paid to the player, whose bet initiated the trigger input, which caused the counter to reach a count corresponding to the random number. Following this win, the counter can continue counting until all the random numbers defining winning entries have been reached and can then be reset.

An alternative which is particularly attractive, since it provides an extremely flexible system, is to use a selection generator which comprises a random number generator and which is used either with a paytable having a sequence of consecutive numbers defining said winning entries or a plurality of random numbers defining said winning entries.

This latter type of selection generator is particularly preferred, because it is then very easy for the casino management to configure the jackpot system so that the probability of a win being generated in response to a trigger input can be varied in accordance with at least one of the following inputs:

time of day,
geographic location of the respective gaming position,
instantaneous jackpot value,
amount of bet,
player attributes,
player activity level,
player contribution to the jackpot,
minimum possible bet amount (denomination, for example one dollar machine or ten dollar machine),
level of activity in casino (for example slot occupancy, i.e. number of gaming positions in play or number of patrons in the casino),
system generated functions of time and/or location and/or any combination of the above listed inputs,
predetermined patterns, for example, comprising specific functions of time and/or location and/or jackpot value.

Thus, simply by way of example, the casino management has the opportunity to change the probability of a jackpot win, so that it is higher at otherwise slack times of the day and thus to encourage players to come to the casino during this time period, so that the casino is better frequented and the turnover rises.

It is particularly convenient if the inputs mentioned immediately above are used to define a dynamic probability matrix controlling said selection generator.

Thus, for each trigger input, the dynamic probability matrix can modify the range of numbers within which the selection generator can generate a random number and can change the chance of the winning entry being generated accordingly. That is to say, in the preferred embodiment said means for varying the probability of a win comprises means for varying the range of random numbers capable of generation by said selection generator in response to each trigger input.

The means for varying the probability of a win can also comprise means for varying the associated entry in the dynamic probability matrix, which can be the same or different for all gaming positions.

It can be seen from the foregoing that the selection generator and dynamic probability matrix concept of the present invention provides the casino management with a very flexible tool for varying the chances of a jackpot win. Moreover, as with other configurable elements of the present invention, the casino management can be provided with a menu on a screen enabling it to choose precisely which criteria of the allowed range of criteria it wishes to select for its own particular jackpot operation. The selection generator and the associated paytable/dynamic probability matrix can also be considered as a parameterizable win determination unit including at least one associated game of chance having rules and parameters relating to the rules and associated wins.

The flexibility provided by the jackpot system also applies to the transfer of wins to a player. The mechanism by which such transfers are to take place can also be configured by the casino management. Thus, for example, the transfer of the associated win to a player can take place in accordance with at least one of the following possibilities:

small wins credited to a gaming position meter (for example at a slot machine),
small wins paid out immediately at the gaming position (for example at the slot machine or by the croupier or dealer at a gaming table, or by a ticket or voucher printer),
small wins credited to a cashless card or cashless account in a casino data base (the cashless card and cashless account being associated with the player),
small wins credited to a player tracking bonus points account associated with the players,
larger wins by crediting player account at casino bank,
larger wins in cash at a casino cage,
major wins (for example car, large cash wins, holiday) by special presentation to a player to maximize publicity effect and enhance player interest,
major wins by payment to a cashless account at casino or to a cashless card,
win paid out in accordance with value dependent table.

Moreover, the allocation of the associated win can take place to a plurality of players in accordance with at least one of the following schemes:

a win of a fixed value to a player at a gaming station which triggered the win and a win of a second value or further values (typically smaller) to one or more associated players (for example players at adjacent gaming positions, for example at adjacent slot machines or at the same gaming table),
a win of a first value to a player at a gaming position which triggered the win and a win of a second value or further values (typically smaller) to other members of a predefined group (for example when a win is triggered at a slot machine, a payout is made at a selected gaming table, random selection of gaming table, system selection predefined, or payment is made to all other members of a coach trip).

The flexible jackpot system of the present invention also provides the casino management with the opportunity of running a whole variety of jackpot systems simultaneously and for interlinking the jackpots in accordance with criteria which can again be predetermined by the casino management.

Thus, in a jackpot system comprising a plurality of jackpots, provision is can be made for a proportional payment from each bet wagered in the one jackpot to be paid into a further jackpot.

The further jackpot can comprise at least one of the following:

a jackpot in a jackpot system configured in accordance with the invention,
a further jackpot associated with the same group of selected games,
a further jackpot associated with a different group of selected games,
a further jackpot associated with a different casino.

Moreover, provision can be made, in a jackpot system comprising a plurality of jackpots, for a win associated with one of said jackpots to trigger a payment into such a further jackpot.

Equally, in a jackpot system comprising a plurality of jackpots, provision can be made for a win associated with one of said jackpots to trigger at least one trigger input for a selection generator associated with such a further jackpot.

The computing engine expediently comprises at least one jackpot memory for accumulating a record of inputs into said jackpot and for debiting wins from said jackpot when allocated to one or more players.

One very important and special result of the jackpot system of the present invention is that it provides the casino management with a tool enabling the realization of a totally novel concept, namely the triggering of special events in a casino, designed to enhance player interest and excitement and to provide special awards to players via the jackpot system.

Thus, in a particularly preferred embodiment of the present invention, means are provided for periodically initiating an event affecting at least some of said gaming positions by varying a respective entry in a probability matrix, for example by using system generated functions of time and/or location and/or any combination of the said inputs or predetermined patterns, or, for example by using specific functions of time and/or location and/or jackpot value, the jackpot system further comprising a plurality of items of multimedia apparatus informing the patrons of the impending event and simulating the event, for example, the passage of a conceptual tornado through the casino.

Moreover, when such events are staged, means are preferably provided for operating said items of multimedia apparatus to explain to patrons in a casino the cost of the event to the casino, for example representing the amount paid out in response to the event as the damage caused by the event.

Said units of multimedia apparatus expediently form a part of said computer network.

Another benefit of the present invention in relation to such events is that it provides the casino management with a tool for statistically pre-evaluating or simulating the cost of a said event to the casino.

In one preferred embodiment of the present invention, a parallel computer system is provided duplicating or multiplicating said jackpot system in the sense of carrying out in parallel all computer operations of the jackpot system and means for continuously or repeatedly comparing the results of the jackpot system and the parallel computer system(s), and means for indicating a fault in the event of discrepancies or means for taking majority decisions.

The present invention also relates to methods and apparatus in accordance with the attached subordinate claims.

Moreover, the present invention provides methods of testing a jackpot system. In one embodiment the test method comprises the steps of repeatedly testing the communication channels throughout the network to ensure all attached units are functioning correctly, repeatedly triggering self-tests of the attached units and checking the results.

In another embodiment the test method comprises repeatedly performing program verification steps for all critical programs and repeatedly checking all critical parameters stored within the jackpot system and the step of indicating a system fault if the program verification step fails for any such critical program or critical parameters and the step of remedying said fault automatically or by an operator.

BRIEF DESCRIPTION OF THE DRAWINGS

The invention will now be described in more detail with reference to embodiments and to the accompanying drawings, in which are shown:

FIG. 11 is a diagram summarizing the present invention.

DETAILED DESCRIPTION

Figure 1:
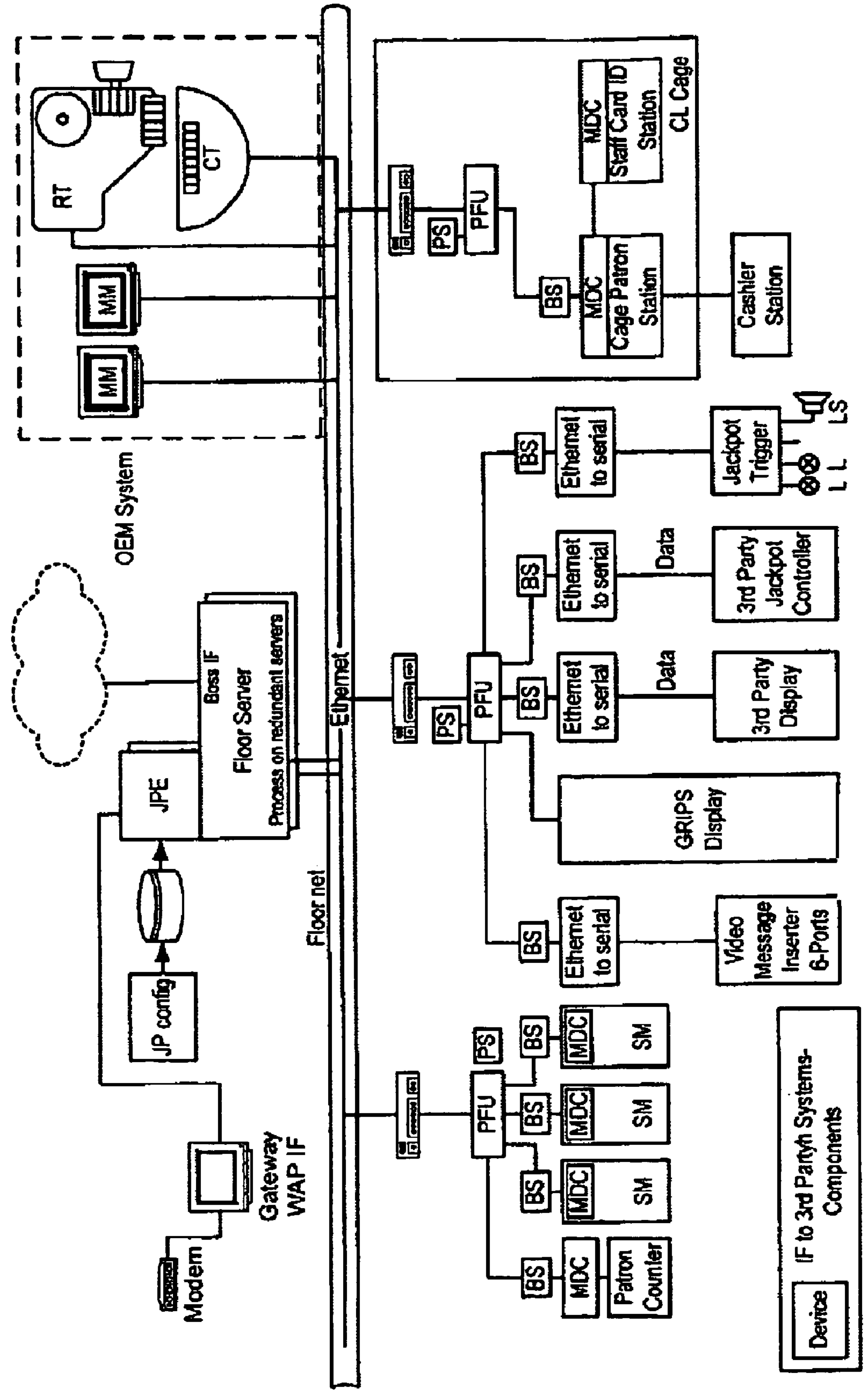
FIG. 1 is an overview of a system currently obtainable from Grips Electronic Gesellschaft mbH under the trademark “CRYSTAL WEB”, which can be used to operate the jackpot system of the present invention.

FIG. 1 shows the Grips “CRYSTAL WEB” system which is used in casinos for data acquisition from slot machines (SM) and for handling any of the known jackpot systems with inputs from slot machines (SM). It will be readily apparent to a person skilled in the art that the system of FIG. 1 comprises a plurality of gaming positions (slot machines SM) associated with a computer network including a computing engine, here the jackpot engine JPE, for receiving inputs from the gaming positions SM and at least one output communicating information to players. Such outputs are, for example, present at the gaming positions SM. They are shown here generally in the form of the Grips display and in the form of the unit identified as a jackpot trigger, which can trigger lights L and a loudspeaker LS to signify the winning of a jackpot by operation of lights L and loudspeakers LS respectively. The jackpot engine is connected to a floor server. The other units shown in FIG. 1 are also connected to the floor server via a computer network using the Ethernet protocol and corresponding Ethernet hubs. The bubble labeled OEM system shows that original equipment from other manufacturers can be connected into the same system via a line to the floor server. This connection can also be made via the Ethernet network if desired. The item labeled GATEWAY WAPIF shows an input possibility for the inputting of information into the jackpot, for example an initial payment to set the jackpot to its minimum level. The modem attached to the computer, keyboard and screen arrangement labeled GATEWAY WAPIF permits information concerning the jackpot to be input from another casino, one of the possibilities which already exists as noted above. The box labeled JP configuration simply means an input which allows the jackpot engine to be told, in the conventional arrangement, what sort of jackpot it is running, for example a mystery jackpot. The device labeled PATRON COUNTER counts the number of people entering and leaving the casino so that the casino knows at any one time how many people are present there. The box labeled VIDEO MESSAGE INSERTER refers to the possibility of inserting video messages which can, for example, be shown on the item labeled GRIPS DISPLAY. The box at the bottom right hand side of the drawing refers to functions of the cashier station. For example the cage (patron station) is a position where money or tokens can be paid out to the patron taking his winnings or collecting a jackpot prize and where patrons can change money for chips or tokens for use in slot machines and at gaming tables. The box labeled STAFF CARD ID STATION is to ensure that anybody handling money at the cage is authorized to do so, i.e. permits the identification of authorized casino personnel.

The items labeled HUB are Ethernet hubs, the items labeled PFU are power feeding units, the item labeled PS signifies a power supply, and the items labeled BS stand for bank socket meaning a plug connection. Important in this drawing are in particular the items labeled MDC. This is a product of the company GRIPS Electronic Gesellschaft mbH which enables the automatic acquisition of all relevant data from the attached units and for transmission of this data via the computer network into the computer system for further use.

More specifically, the MDC units associated with the slot machines and other units can, for example, provide the following items of information:

a value related to the amount bet at each game at the gaming position, information relating to the time at which each game is played, an indication of the identity of the gaming position (slot machines or positions at gaming tables or the gaming table itself), information relating to the geographical location of the gaming position, information relating to the identity of the player (for example from player card such as to name, age, sex, member of group), player level (for example frequency of past visits, total turnover, turnover per visit, number of games per session, average bet per game), information on the type of game played, achievement of a specific win combination at the gaming position, information relating to an external event, such as a manual input from an operator or an input from another jackpot or jackpot system, information whether the gaming position is in operation, information on the number of patrons entering the casino and/or leaving the casino.

The illustrations at the top right hand corner of FIG. 1 inside the broken line indicate units which are not present in the existing system but which will be added to the computer network if the full benefits of the jackpot system of the present invention are to be realized. Although not shown, the connection to the network takes place in the same manner as for the other units in FIG. 1. First of all, the items labeled MM indicate multimedia displays which will typically be distributed throughout the casino (only two are shown for the sake of simplicity (see also the items MM1 to MM6 in FIG. 8)) and which will serve to provide players not only with additional information concerning the jackpot and the winning thereof, but which can also be used to indicate impending events and simulate the actual occurrence of the event and the situation after an event, as will be described later in more detail.

The items labeled CT and RT respectively stand for CARD TABLES and ROULETTE TABLES which, in accordance with preferred embodiments of the invention, are also connected to the computer system and which can also serve for the initiation and triggering of jackpots. Only one card table and one roulette table are shown by way of example. In practice, there will be a plurality of each kind of table. Suitable electronic systems for card tables with electronic chip tray readouts and provision for making side bets are described in U.S. Pat. Nos. 5,755,618 and 5,919,090 of the present patentees. Suitable electronic arrangements for a roulette table are described in U.S. patent application Ser. No. 09/267,464 of the present assignees.

The box labeled THIRD PARTY JACKPOT CONTROLLER signifies the possibility of using the Grips system with a jackpot controller from a third party, should a customer wish to have this facility. The box labeled THIRD PARTY DISPLAY signifies the possibility of operating third party displays, which can also be multimedia displays, to communicate the winning of a jackpot to a wide variety of patrons in a casino, or in an associated casino, and can also be incorporated in a display relative to a special "event" staged in accordance with the present invention, as will be discussed later.

Turning now to FIGS. 2 to 7, the basic concept of the jackpot system of the invention will now be described, and indeed in a manner intended as an instruction to the designer for software for implementing such a jackpot system. It should be stressed that although the present invention can be realized using physical items of apparatus each intended to carry out one of the functions quoted, the invention will more usually be realized as a software package, which can be used in a system in accordance with FIG. 1, without departing from the basic layout of that system. The invention can also be realized with other computer-based network systems, as will readily be apparent to one skilled in the art.

Figure 2:
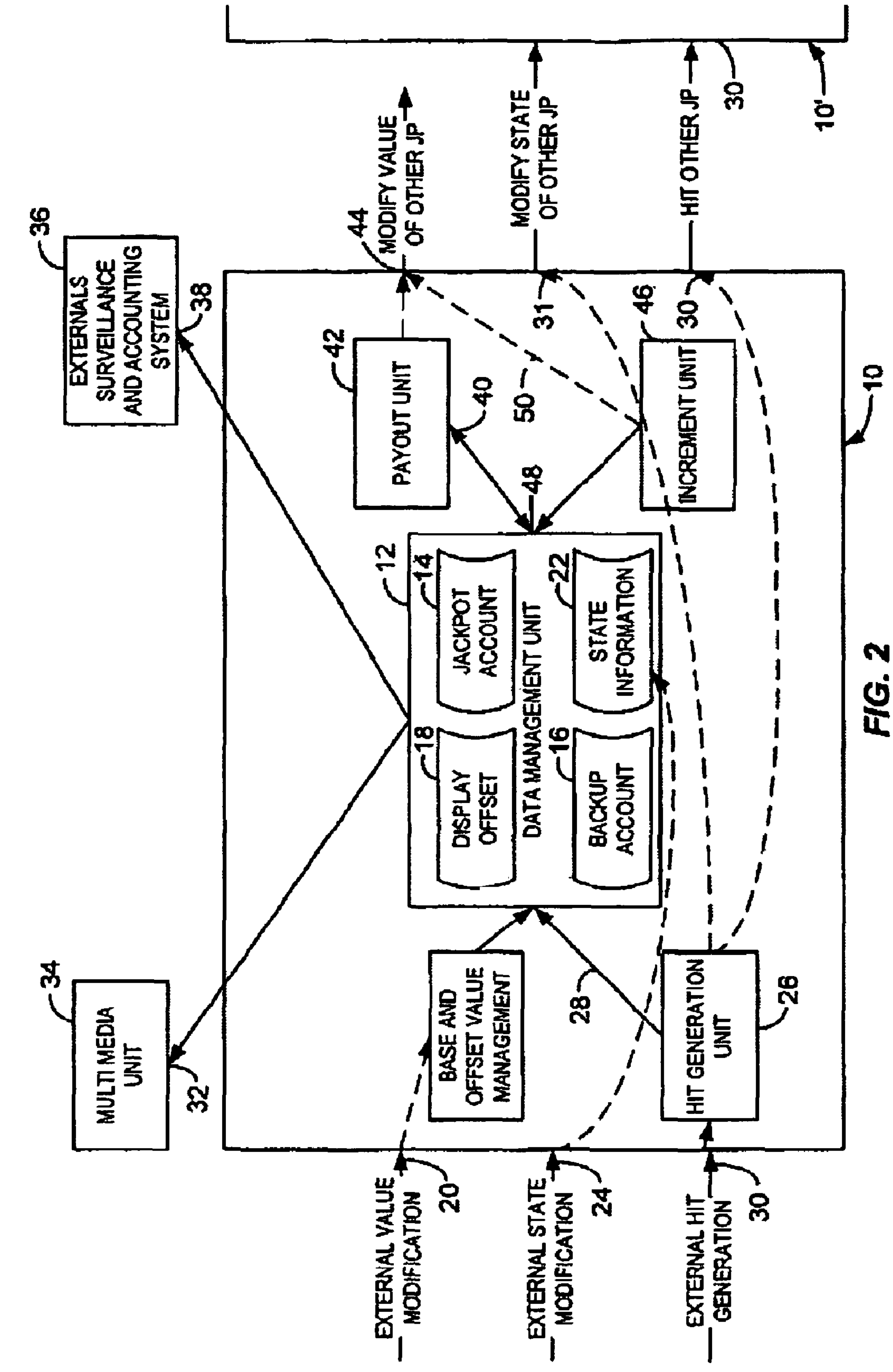
FIGS. 2 to 6 are a series of block diagrams illustrating the jackpot system of the present invention and serving as an instruction to a programmer as to how the jackpot system must be configured from the point of view of hardware and software to enable the benefits of the invention to be achieved.

The rectangular box 10 of FIG. 2 basically represents the heart of the jackpot system and is of particular importance in connection with the present invention, because it offers, for the first time, the possibility of operating a plurality of jackpots simultaneously. For this purpose it is simply necessary to imagine a second box 10' basically identical in concept to the box 10 of FIG. 2 being placed to the right of the box 10 of FIG. 2, so that inputs from the jackpot system 10 can be made into the jackpot system 10', illustrated only by a vertical line in FIG. 2, and indeed there is basically no limit to the number of different jackpots which can be organized in this way, i.e. further jackpot systems could be provided in sequence to the right of the jackpot system 10'.

A core element of the jackpot system 10 of FIG. 2 is the box 12 labeled DATA MANAGEMENT UNIT. This unit contains the actual jackpot being managed by the jackpot system 10, i.e. one single jackpot 14, which is referred to as a jackpot account, because it will, at any point in time, have a specific value. The box 16 labeled BACKUP ACCOUNT is the account discussed previously and is organized in the way already described, i.e. a proportion, which is not necessarily a fixed proportion, of all inputs to the jackpot account can be transferred to the backup account to provide a reserve when the jackpot in the jackpot account 14 has been won. The box 18 labeled DISPLAY OFFSET represents a display of the contribution to the jackpot account of box 14 from one or more other casinos or as a result of the contribution paid in to the jackpot account by the management of the casino operating the jackpot system 10 in order to start the jackpot running at a certain minimum value.

These inputs into the data management unit 12 are external inputs, on the one hand, from other casinos, and, on the other hand, from the management of the casino running the jackpot system 10. This external value input is indicated by the arrow 20 in FIG. 2.

The data management unit also contains a box 22 labeled STATE INFORMATION. This comprises a whole list of details of the gaming machines, slot machines and/or gaming tables which participate in the jackpot system 10 as well as detailed information on the rules which have been set up for the operation of the jackpot system 10, i.e. details of the specific configuration selected by the casino management and details regarding wins.

The arrow 24 indicates the possibility of inputs from the casino management to change the configuration of the jackpot system as recorded in the state information box 22. Again, this is an external input into the jackpot system 10.

The box 26 labeled HIT GENERATION UNIT signifies the generation of "hits", i.e. the playing of a game of chance which can lead to a "hit", i.e. a win which is subsequently allocated from the jackpot to one or more players. The hit generation unit 26 will be described later in more detail with reference to FIG. 5 and is essentially a selection generator as specified in the appended claims. The solid arrow 28 extending from the hit generation unit 26 to the data management unit 12 represents a flow of money into the data management unit. This flow takes the form of electronic data relating to financial transactions. The arrow 30 indicates the possibility of triggering the hit generation unit 26 from an external input, for example when a jackpot is won in another system, this can trigger an activity in an attached jackpot system. By the same token the arrow 30 at the extreme right of FIG. 2 signifies that a jackpot win in the jackpot system of FIG. 2 can serve as a trigger (arrow 30') for the hit generation unit of an attached jackpot system 10'. Moreover, the arrow 31 signifies that a "hit" in the jackpot system 10 can be used to modify the state of another jackpot in another jackpot system, e.g. 10'. By way of example a "hit", i.e. a win, in one jackpot system such as 10 can be used change the state of a jackpot in another jackpot system such as 10' from inactive to active.

If the information coming from the hit generation unit shows that the jackpot has been won, then this also results in a flow of information from the data management unit 12. Thus, on the one hand, information is sent in accordance with the arrow 32 to one or more multimedia units indicated by the box 34. For example, this multimedia unit 34 can be used to control displays to generate sounds, generate smoke and to operate lighting systems to indicate the winning of a jackpot. The display not only serves to show the level of the jackpot that has been won, but also to announce the winning of the jackpot, and, slightly later, to give information on where the jackpot has been won. The fact that the jackpot has been won is known extremely quickly. However, the assessment of the gaming position at which the jackpot was won typically takes some time. The separate announcement of the winning of the jackpot and then later of where it has been won in any event serves to promote excitement and interest in the casino. Information from the data management unit is also passed in accordance with arrow 38 to an external surveillance and accounting system 36, which generally monitors monetary accounting information and the flow of money in the casino and can thus make certain the financial system is working correctly. Systems of this kind are already known per se and do not form part of the present invention, although an input to such an external surveillance system is considered an important auxiliary function of a jackpot system in accordance with the present invention.

Because the inputs to the multimedia unit 34 and to the external surveillance and accounting system 36 represent monetary transactions, they are shown, in accordance with the convention used in FIGS. 2 to 7, as a solid line.

Once the jackpot has been won, a payout has to be made. Therefore there is a flow of information in accordance with the arrow 40 to an element of the jackpot system referred to as the payout unit, which can again be realized as an item of software. This payout unit 42 is responsible for the allocation of the win to a player (or to a group of players, as will be described later). It also contains programs, subroutines, which enable a part of the payout to be made to a player or to a group of players, and a part of the payout to be made to the jackpot of another system, as indicated by the arrow 44.

The increment unit 46 is the unit which actually increases the value of the jackpot account and the backup account. Its operation will be described shortly in connection with FIG. 3.

Basically, information from each gaming position 52 relating to each new game results, via the increment unit 46, in an increment of the jackpot account as indicated by the arrow 49 and an increment to the backup account, and optionally also to a modification of the value of another jackpot as shown by the arrow 50. The financial information relating to the increment, the jackpot account and the backup account flows in accordance with the solid line arrow 48 in FIG. 2 into the data management unit 12 and, should the increment formula show, for example, that the jackpot account and the backup account are relatively full, because the jackpot has not been won recently, then the possibility exists, as indicated by the arrow 50, of transferring money to another jackpot, such as the jackpot 10'.

Having outlined the basic layout of the jackpot system of FIG. 2, it is now useful to look at the detail in the further FIGS. 3 to 7 in turn.

Figure 3:
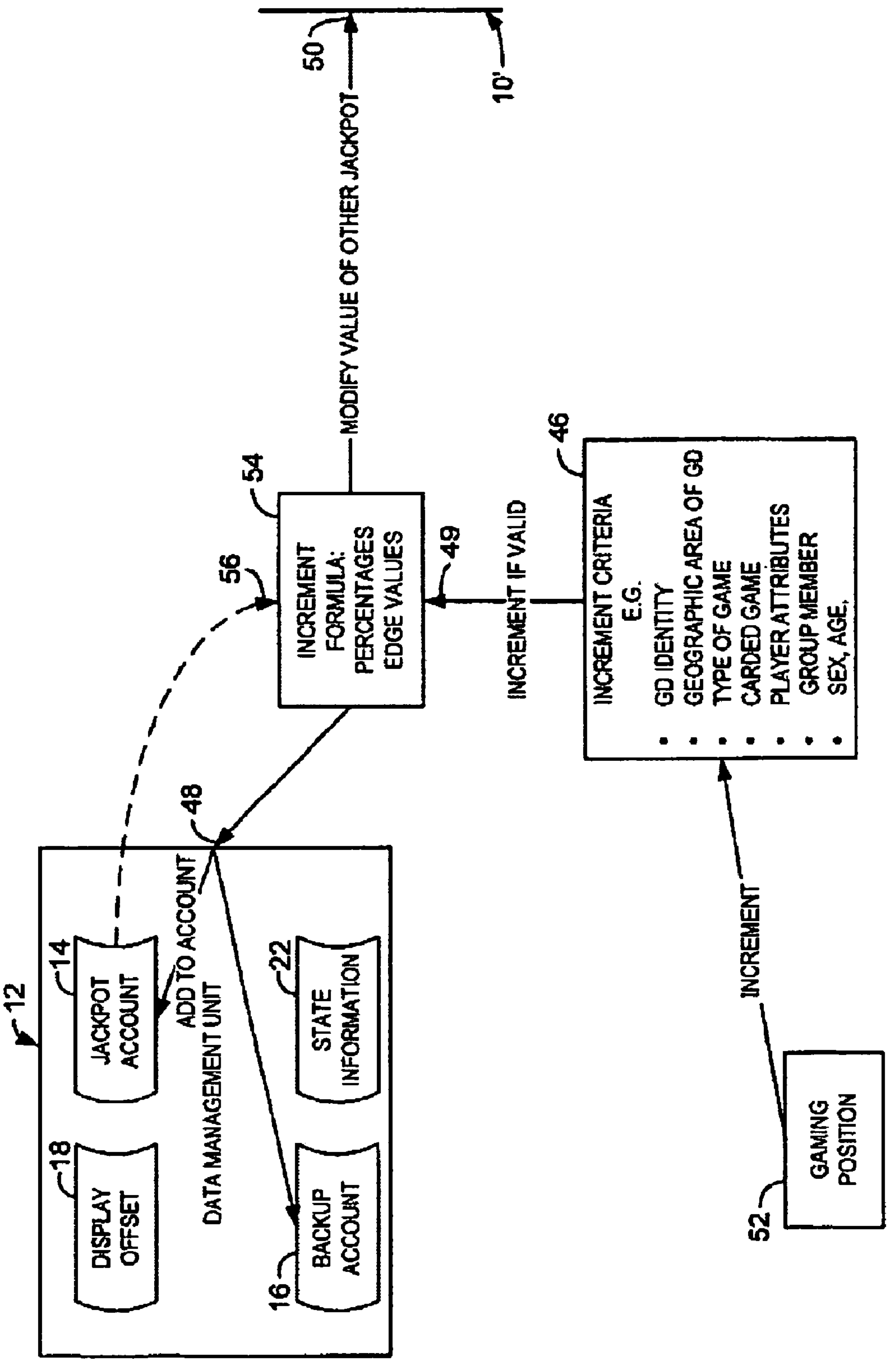

Turning first to FIG. 3, there can be seen the same data management unit 12 as is shown in FIG. 2 for the jackpot system 10, and there can also be seen the increment unit 46.

As already mentioned, each gaming position associated with the jackpot system 10, shown here by the reference numeral 52, will give rise to an increment in the jackpot system 10 and, optionally, depending on the rules configured by the casino management, to an increment in a further jackpot system 10', as indicated by the arrow 50.

The gaming position 52 can be any gaming position in the casino. That is to say, it can be any slot machine, it can be any gaming machine (such as a video game), it can be any gaming table (such as a roulette table) or any card table (such as a black jack table). At the gaming tables and card tables the increment will normally take the form of a side bet, a fraction of which will be a contribution to the jackpot, i.e. an increment to the jackpot. In the case of a slot machine, each game played represents a bet made by the player and is equivalent to a bet being wagered. A proportion of this bet will be allocated as an increment to the jackpot system. A similar situation applies to each video game.

The present invention provides the casino management with the possibility, through the increment unit 46, of selecting the proportion of the side bet or bet wagered for each gaming position in dependence on a variety of criteria. The first of these criteria is the identity of the gaming device (GD) at the gaming position. Thus, the increment criteria can, for example, specify that all low bet machines, i.e. those with a basic denomination of, say, one dollar are excluded from the jackpot, but all machines with a denomination of ten dollars or above provide an increment of a selectable percentage to the jackpot system. This percentage can differ, depending on whether a slot machine or a video game is involved. Therefore, the type of game is also relevant to the selection of the increment criteria and both the games eligible for the jackpot and the increment criteria can be specified by the casino management.

The geographical location of the gaming device can also serve as a criteria for the incrementation of the jackpot. For example, the jackpot can be a jackpot restricted to gaming positions in a certain area of the casino, which can be selected by the casino management as one of the increment criteria.

Moreover, the reference to type of game means that different criteria can be specified for games played at gaming tables or card tables, for instance here the jackpot contribution will normally be a proportion of a typical side bet.

The reference to a "carded game" in box 46 in FIG. 3 means a game played by a player having a player card and then special criteria can be applied, for example all players having cards can be entitled to play for another jackpot in a different jackpot system, thus resulting in an increment in accordance with the arrow 50 to another jackpot.

Moreover, player attributes can be taken into account, such as whether the player at the gaming position is a member of a specific group and also the sex and age of the player can be taken into account. Thus, for example, if the casino is visited by a group of people on a coach trip, then they can play for a special jackpot, which, for example, may be based only on their contributions to the casino turnover. These contributions will be assessed from the gaming positions at which they are playing, e.g. from special cards issued to them and used to initiate play at different gaming positions having a suitable card reader, and the increment to the jackpot system could again here go to increment a special jackpot, in accordance with the arrow 50.

Moreover, a casino may, for example, find that it is frequented during the afternoon, a typically low period in a casino, by elderly ladies. The casino may wish to promote gaming by such elderly ladies during the afternoon. Thus again, the casino management has the possibility by entering details of the sex and age of ladies to allow these ladies to play for a special jackpot 101, via the arrow 50, or the jackpot involved may be the jackpot 10. The casino management also has the opportunity—as will be explained later—of enhancing the chances of such players winning during a certain period in the afternoon.

Once the increment unit 46 has decided that an increment should be made to the jackpot system, and the size of that increment, it is communicated to box 54, in actual fact a subroutine and the relevant increment is fed into an increment formula, which works out, on the basis of the increment criteria, the actual contribution to the jackpot account 14, the contribution to the backup account 16, and/or the contribution to the other jackpot 50. Since the increment formula, in particular for deciding which proportion of an increment is paid into the jackpot account 14 and which proportion into the backup account 16, typically depends on the level of the jackpot and the jackpot account 14, the arrow 56 indicates a feedback of information to the unit 54, i.e. to the subroutine, which can change the value in the formula. For example, when a new jackpot is started and the amount in the jackpot account is low, the increment formula may specify that 4% of the amount bet at each slot machine goes to the jackpot account, 1% to the backup account, whereas, when the jackpot account is high, the ratio may be changed to 2% to the jackpot account and 3% to the backup account. In both cases, in this example, 5% of the amount bet is used for jackpot entries. In all cases the level chosen and the split between the jackpot account, the backup account and one or more further jackpots can be specified by the casino management and represent further criteria for game configuration in accordance with the present invention.

Figure 4:
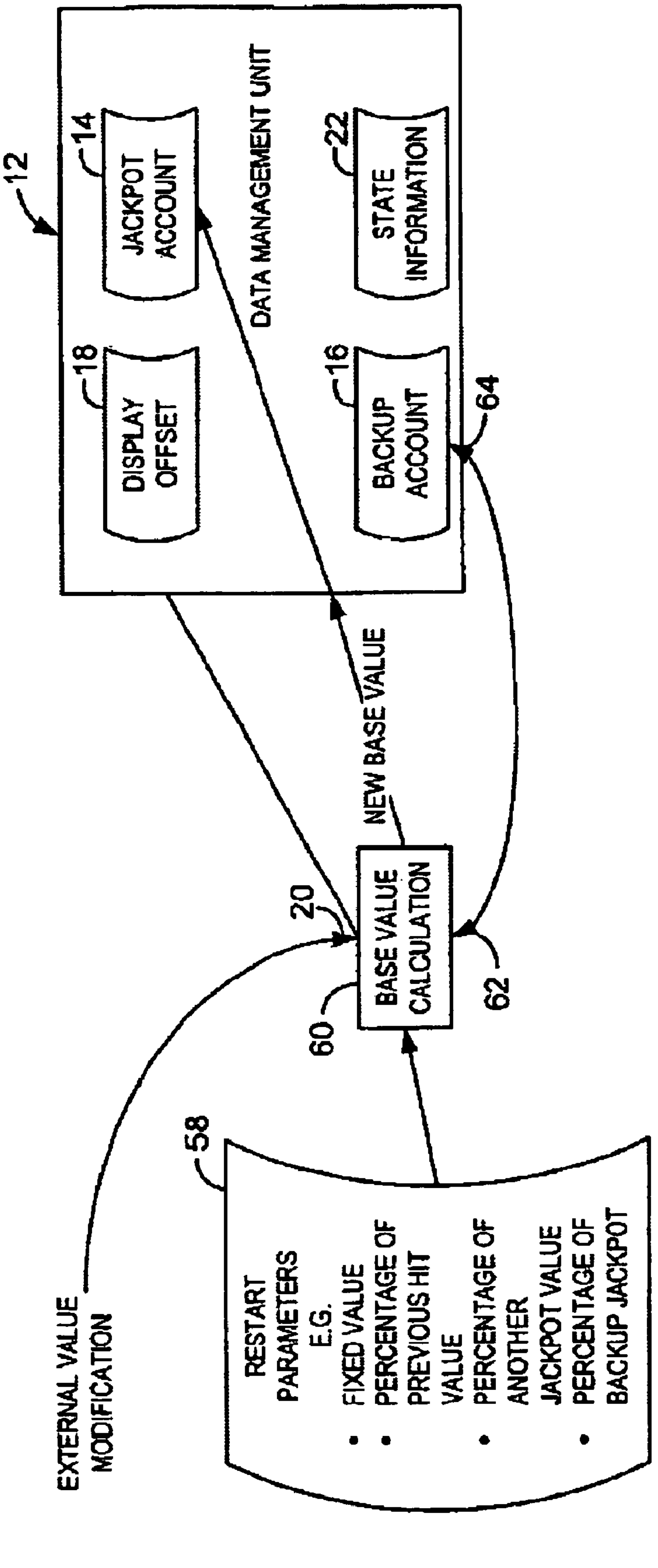

Turning now to FIG. 4, it is possible to see how the jackpot system is initially set up. For the sake of argument it is assumed that the jackpot account is empty, having just been won, or that it is a new jackpot where no jackpot is as yet present. The arrow 20 represents an input from another casino, typically a casino belonging to the same company, which is used to augment the jackpot account 14. This contribution from an outside casino results in the corresponding value being displayed for the casino management in the box 18 labeled DISPLAY OFFSET (which is not itself a display but rather an instruction to an indicated unit to display the amount received). This information is purely for the casino management and is not seen by the patrons of the casino. If the jackpot has been restarted, then an amount of money must be transferred into the jackpot account 14. The restart parameters (box 58) can, in accordance with the invention, be configured by the casino management and they are therefore offered the opportunity to restart the jackpot account 14 with a fixed value, with a percentage of the previous jackpot, or with a value comprising a percentage of another jackpot, or with a percentage of the sum in the backup account. Equally, the restart parameter for the jackpot account could comprise a function of any combination of these values. This function forming the basis for evaluating the new base value for the jackpot is stored in a subroutine indicated by the box 60. Equally, the base value calculation unit 60 needs to have information on what is in the backup account and it receives this as a flow of information indicated by the arrow 62. In the same way, the base value calculation unit may also wish to change the sum in the backup account 16. This is indicated by the arrow 64.

Figure 5:
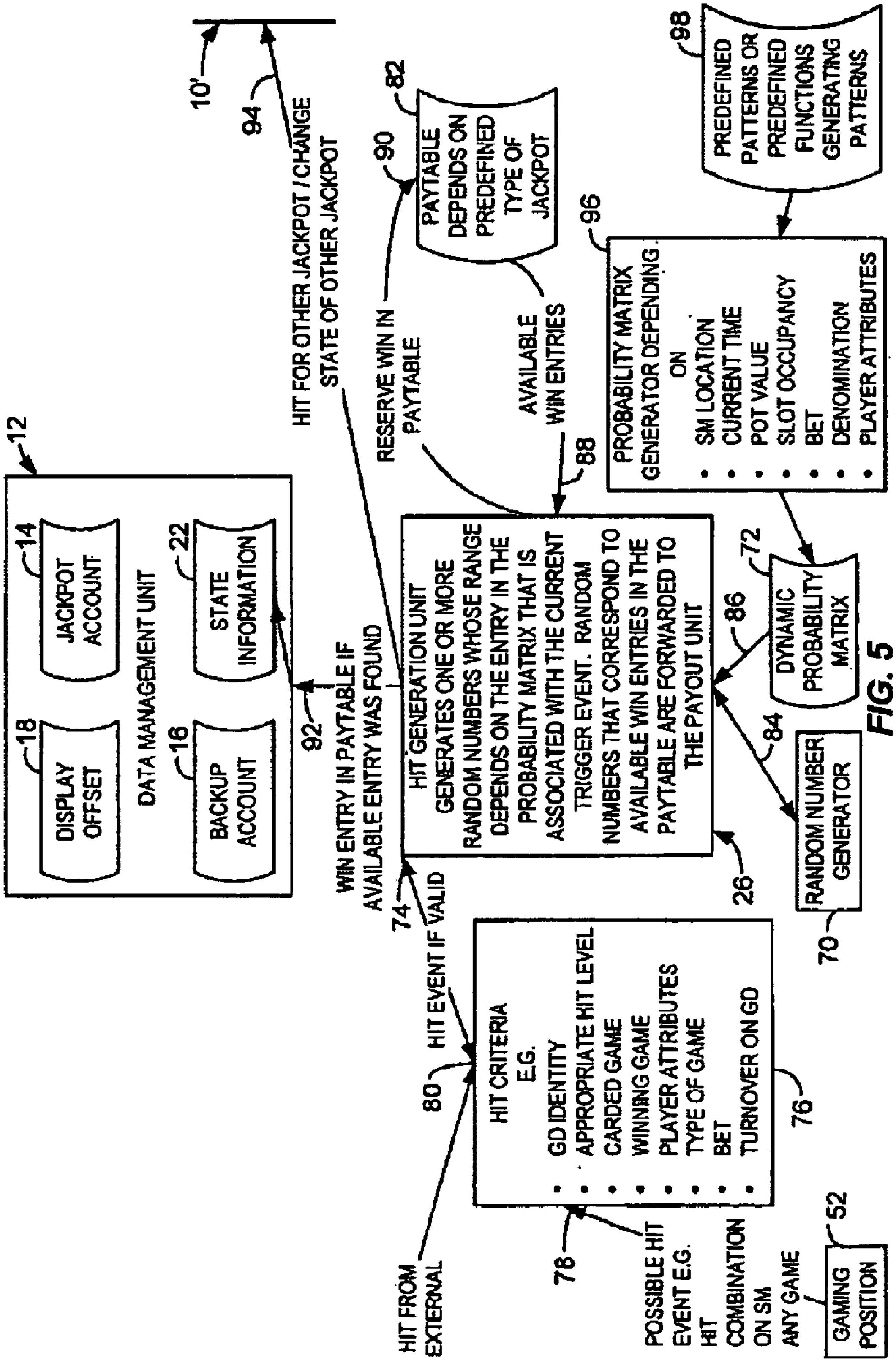

FIG. 5 now shows a core feature of the present invention, namely the hit generation unit 26 which determines whether the jackpot has been won. The winning of a jackpot prize is frequently termed a "hit" in casino circles.

One way of realizing the hit generation unit 26 is to configure it as a random number generator that responds, each time it is triggered, to generate a random number in a specific range. The actual generation of the random number will typically take place in a subroutine identified in FIG. 5 as box 70. The range of numbers within which the random number generator 70 can generate a random number is determined by a dynamic probability matrix indicated in box 72. Basically the function of the dynamic probability matrix (box 72) is to adapt the range of numbers within which the random number generator generates a random number for each trigger signal 74 arriving at the hit generation unit.

Before discussing the dynamic probability matrix 72 in more detail, it is first appropriate to look at the chain of events which can give rise to a trigger input 74 at the hit generation unit. The program basically contains a list of hit criteria or trigger criteria 76, which can be selected at will by the casino management, i.e. which form, in accordance with the invention, another possibility for the casino management to configure the jackpot system to meet its own requirements.

The basic element which can lead to a trigger event 74 is the playing of any game at a gaming machine, such as a slot machine or video game, or the playing of any game at a gaming table or any hand of a card game. Irrespective of whether we are considering a game played as a slot machine or a video game played at a video game machine, or a game played at a gaming table, or a game played at a card table, there will be a gaming position associated with the game. This gaming position is indicated by the box 52 in FIG. 5, which represents the same information as the box 52 described in connection with FIG. 3.

In the case of a slot machine, the potential trigger signal will thus be each activation of the game at the slot machine, for example by the player pressing the start button. The slot machine defines the respective gaming position in this case. In the case of a gaming machine, such as a video game, the trigger signal will be the initiation of each new game by the player. The video game will also define the respective gaming position in this case. In the case of a card game, the trigger signal will generally be the placing of a side bet by a player at the card table. As a rule, the size of the side bet will be fixed for the card table involved, for example 1 dollar or 10 dollars, and the placement of the bet will noted by a side bet sensor uniquely associated with each player position at the table. Here the player position is the gaming position. Alternatively, the side bets could be collected by a croupier who presses a button to associate each side bet with a particular player at a particular gaming position at the card table. The situation in the case of a gaming table, such as a roulette table, is the same.

Thus, any of the aforementioned activities at any gaming position 52 results in a signal being sent, arrow 78, to the program box 76, where an analysis is made to see whether the input received as an arrow 78 qualifies as a trigger input 74 to the hit generation unit.

The hit criteria listed in box 76 are the following:

Firstly "GD IDENTITY", i.e. the identity of the gaming device (slot machine, video game, gaming table, card table). This input gives the casino management the possibility of, for example, stating that low denomination gaming machines do not participate in the jackpot, whereas higher denomination gaming machines, for example those where the minimum bet is ten dollars, do participate in the jackpot. Equally, this criterion can be used to include or exclude some or all of the gaming tables or card tables.

The next criterion is the "APPROPRIATE HIT LEVEL". It may, for example, be considered appropriate to send one trigger signal 74 to the hit generation unit for, say, a gaming machine with a ten dollar stake, but a different number of trigger signals, for example two trigger signals, if a player at a card table places a side bet at a minimum level of ten dollars. It will be appreciated that such discrimination is appropriate because the player at the gaming machine is participating in a game at the gaming machine, at which he has a certain prospect of winning. The player at the card table has, however, not only played a game but also placed a side bet, with the side bet being specifically directed to the jackpot. Accordingly, the only "game" that he plays in connection with the side bet is the side bet itself. It may be considered more appropriate to allow such a side bet to trigger two or more chances of winning the jackpot at the hit generation unit, realized by two or more trigger signals to the hit generation unit (arrow 74).

If the game is a "CARDED GAME", i.e. a game played by a player having a player card, then, if he is a frequent player, the casino may wish to entitle him to more than one chance of winning the jackpot for each game played. Thus, the casino management can again decide to initiate two trigger signals 74 if the trigger signal from the gaming position 52 is such a carded game. Again, this is a configuration possibility for the casino management.

It is possible that the game which has been played at the gaming position 52 and which has sent a trigger signal 78 to the hit criteria box 76 it itself a "WINNING GAME". Under these circumstances the casino management may decide to grant the player at the gaming position a further chance or further chances of winning the jackpot and thus permit two or more trigger signals 74 to be sent to the hit generation unit once a winning game has been played. Alternatively, the casino management may decide that if a player at the gaming position 52 has played the winning game, he should not then also participate in the jackpot and thus inhibit the transmission of a trigger signal 74 to the hit generation unit.

The entry in the box 76 "PLAYER ATTRIBUTES" refers to the possibility of rewarding certain categories of player with increased chances of participating in the jackpot or of only permitting players having certain attributes to participate in the jackpot. For example, if the casino management is trying to attract elderly female players during the period from 2 to 4 in the afternoon and wishes the jackpot to be configured so that only these players contribute to the jackpot or have a chance of winning the specific jackpot, then it can make suitable entries into the computer system so that only players having these attributes, i.e. elderly female players (say over sixty) playing at gaming positions 52 result in trigger signals 74 to the hit generation unit 26. Again, returning to an earlier example, if a group of players who have arrived in a coach are to play for a special jackpot, then the player attributes entry can be used to identify just those players and ensure that only trigger signals resulting from games played by them result in trigger signals 74, so that only this group of players is entitled to play for the specific jackpot 10 or 10'.

The entry "TYPE OF GAME" provides another possibility for the casino management to configure the jackpot so that only certain types of game are entitled to play for a specific jackpot. Thus, this input enables the casino management to decide which types of game will give rise to a trigger input 74 and indeed how many triggers result per game.

The entry "BET" provides an opportunity for the casino management to specify that only individual bets per game in excess of a certain amount qualify for the generation of a trigger signal 74. Thus, a whole variety of decision-making possibilities are presented to the casino management (as in all other cases here expediently in the form of a suitable series of masks on a computer screen) so that the casino management can objectively decide which trigger input 74 it will allow having regard to the specific jackpot 10, 10' under consideration.

Finally, the entry "TURNOVER IN GD" signifies the possibility of allowing a patron who is playing on a gaming device which does not normally qualify for participation in the jackpot, to participate in one or more jackpot games each time he has clocked up a certain turnover on the gaming device.

One further possibility indicated in FIG. 5 is that a trigger (hit) from an external source can also be allowed to trigger one or more trigger signals 74 at the hit generation unit 26. This entry (arrow 80) could come from a whole variety of sources. On the one hand, certain employees of the casino may be authorized to trigger signals 74 for specific players under certain circumstances. For example, one or more chances to play for the jackpot (each representing a trigger signal 74) may be selected as a way of rewarding a particular patron for some reason, for example, a player who has bet heavily at a gaming table and lost, i.e. a type of consolation prize. Alternatively, a manual input may be used if, for whatever reason, a trigger signal from a gaming position has been found to be defunct.

Figure 7:
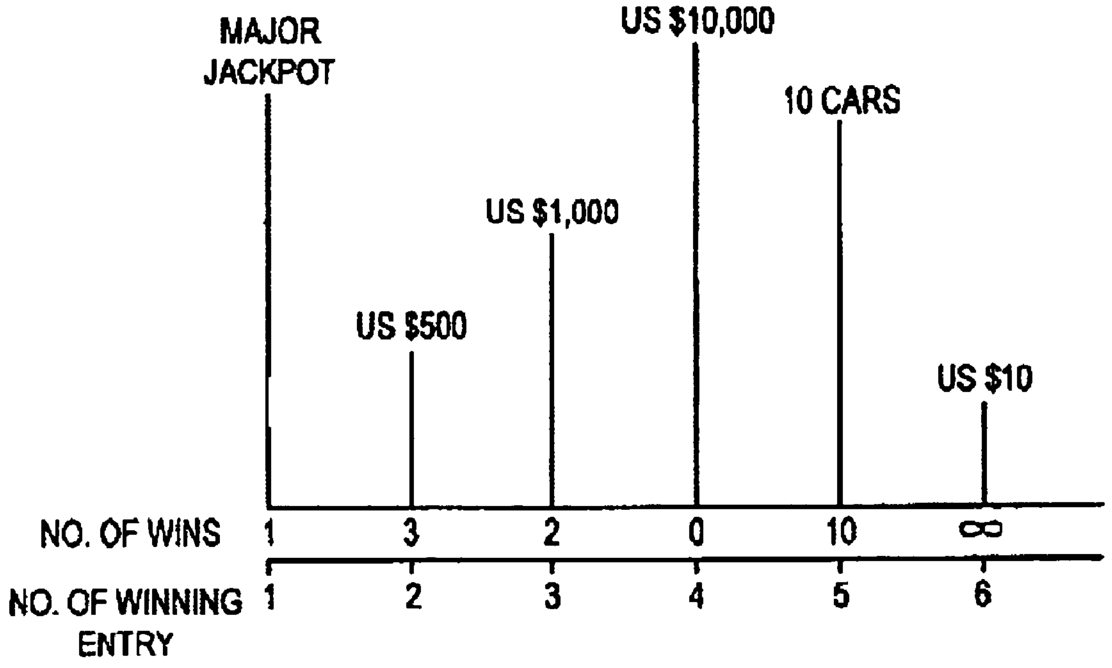
FIG. 7 is an example for a paytable (also known as a pay table or win table)

Whenever a trigger signal 74 arrives at the hit generation unit, or at the corresponding software block, a game of chance is initiated. The playing of this game is most conveniently arranged around a win table, an example of which is shown in FIG. 7. The win table is basically a series of numbers, here the numbers 1 to 6, with one or more prizes being associated with each number in the win table. In the example shown in FIG. 7, the major prize, which may be the full jackpot, is associated with the number 1. There is only one major jackpot and therefore this jackpot can only be won once.

The number 2 in the win table is associated with three prizes, which may, for example, all be a sum of money, such as US $500. The number 3 in the win table is associated with two prizes, which may, for example, be US $1000 each. In the win table of FIG. 7 the number 4 was associated with a prize of US $10,000, which has however already been won, so that the number still available is zero. The number 5 is associated with ten major prizes, such as for example ten motorcars, none of which have as yet been won. For wins such as these the system of the present invention also preferably allows the casino to decide the order in which the wins will be allocated.

E.g. the casino may decide that the ten motorcars will comprise nine small cars and one luxury car and may choose to configure the entry so that the nine small cars will be allocated first and the luxury car last.

Finally, the number 6 in the example is associated with ten dollar gratuities, of which there are an infinite number, i.e. these prizes can be repeatedly paid out.

This win table or paytable (sometimes simply referred to as a payout table) thus contains information on winning entries, i.e. the numbers 1 to 6 in this example, on the prizes which can be won, and, in this particular case, also the number of different prizes. It is, however, quite possible to have a paytable where there is just one prize associated with each winning entry. Moreover, there is no limit on the number of winning entries, sometimes called win stops, in the present paytable.

Referring again to FIG. 5 the decision as to whether a game of chance has been won or lost is based on a random number generated by the random number generator 70 in response to each trigger signal 74 arriving at the hit generation unit 26.

Each time the random number generator 70 is triggered, its range, i.e. the range within which it can generate a random number, is set via the dynamic probability matrix 72, with the two arrows 84 and 86 indicating that both the initiation of the random number generator and the taking into account of the appropriate value from the dynamic probability matrix are within the control of the hit generation unit or program 26.

By way of example, in a particular case, the random number generator may be asked to generate a random number in the range from 1 to 10,000. If it generates a number 1, 2, 3, 5 or 6, i.e. the number of a winning entry, then a prize has been won and the particular prize associated with the winning entry can be established by the hit generation unit from the paytable 82. Should the random number generator generate the number 4, then no prizes are any longer associated with this winning entry and therefore the game is lost rather than won. Should the random number generator generate a number in the range from 7 to 10,000, then again none of these numbers constitutes a winning entry and the game has been lost.

Each time a win is made, the number of wins left in the paytable is reduced by one, with the exception of the winning entry 6 in this example, since there there are an infinite number of wins.

The arrow 88 shows that when the hit generation unit detects a win, it refers to the paytable 82 to see precisely what has been won. The arrow 90 shows that it then reduces the number of wins for that winning entry in the paytable by one. At the same time, the winning entry in the paytable which is payable if an available entry was found, is transferred in accordance with the arrow 92 to the box 22, which then organizes the payment of the win in accordance with FIG. 6, which will be described later.

One important feature of the present invention, which is apparent from the arrow 94 in FIG. 5, is that a hit in one jackpot system can be used to trigger a change of state of another jackpot in another jackpot system, for example 10'. This change of state can take various forms. On the one hand, it can simply initiate the operation of another jackpot system. It can also result in the triggering of the hit generation in another jackpot system, so that the possibility exists of a further jackpot win in another jackpot system. Again, this is an option which can be selected by the casino management within the context of jackpot configuration.

It has already been indicated that the range of numbers generated by the random number generator is controlled with reference to a dynamic probability matrix indicated by box 72.

It has already been described, by way of example, that the random number generator could, for example, be asked to generate a random number in the range of 1:10,000 for a particular trigger input 74. The dynamic probability matrix concept 72 offers the possibility for the range of the random number generator to be modified, in response to system configuration data input by the casino management, to change the range of numbers generated by the random number generator, so that the probability of a win is increased or decreased. By way of example, if the range of the random number generator is decreased to, say, 1:5,000, then the chance of one of the winning entries in the paytable being generated is significantly higher than if the range of the random number generator is 1:10,000. Equally, if the range of numbers generated by the random number generator is increased, say to 1:15,000, then the probability of one of the winning entries being generated is reduced.

Box 96 in FIG. 5 illustrates the configuration of the probability matrix. That is to say, 96 is a probability matrix generator which generates a probability matrix having positions dependent on such factors as:

- the location of a gaming position, for example, slot machine or gaming table, the current time of play (to allow the casino management to vary the probability of winning according to the time of day, for example to encourage players to play during otherwise slack periods),
- the pot value, which enables the casino management to, for example, increase the probability of a win when the jackpot is relatively high (to avoid a situation when a high jackpot is never won and players are discouraged).

Moreover, the probability matrix generator provides an input to vary the dynamic probability matrix dependent on the slot occupancy, i.e. the proportion of gaming positions actually occupied by patrons.

The "Bet" entry provides the ability for the casino management to decide that players making larger bets shall have a greater probability of winning, if considered appropriate. The entry labeled "Denomination" enables the casino to determine the probability of winning in relation to the size of the bet (larger bets normally giving rise to a larger chance of winning). The entry "Player attributes" provides the opportunity for the casino to raise or lower the probability of winning for certain player characteristics. For example if the desire is to enhance the chances of elderly lady players winning the jackpot, then this can be done via this input. Equally, if the desire is to reward a particular group of players in accordance with some scheme, then this can also be done via the entry "Player attributes".

This concept is particularly flexible and enables a very special realization of the present invention. The box labeled 98 namely provides the casino management with the opportunity to vary the dynamic probability matrix in accordance with predetermined patterns or predetermined functions generating patterns. To help understand this function, it is best to describe a specific example.

One possibility for exploiting the flexibility given by the box 98 is the running of special events in a casino. For example, as a way of promoting player interest in capturing players' intention inciting players to play, the casino may decide to stage a special event. An example for such a special event might be a tornado moving through the casino. As a prelude to a tornado arriving, multimedia displays such as MM in FIG. 1 (MM1 to MM6 in FIG. 8) can be controlled to warn the players in the casino of an impeding tornado. The patrons are made aware that a tornado is an event which gives them an enhanced opportunity of winning a jackpot prize, but which of course causes damage in the sense of a financial loss for the casino. Because there is known to be an increased opportunity of winning a jackpot prize when a tornado is present, the patrons can be motivated to participate in games, for example during otherwise slack periods in a casino.

Figure 8:
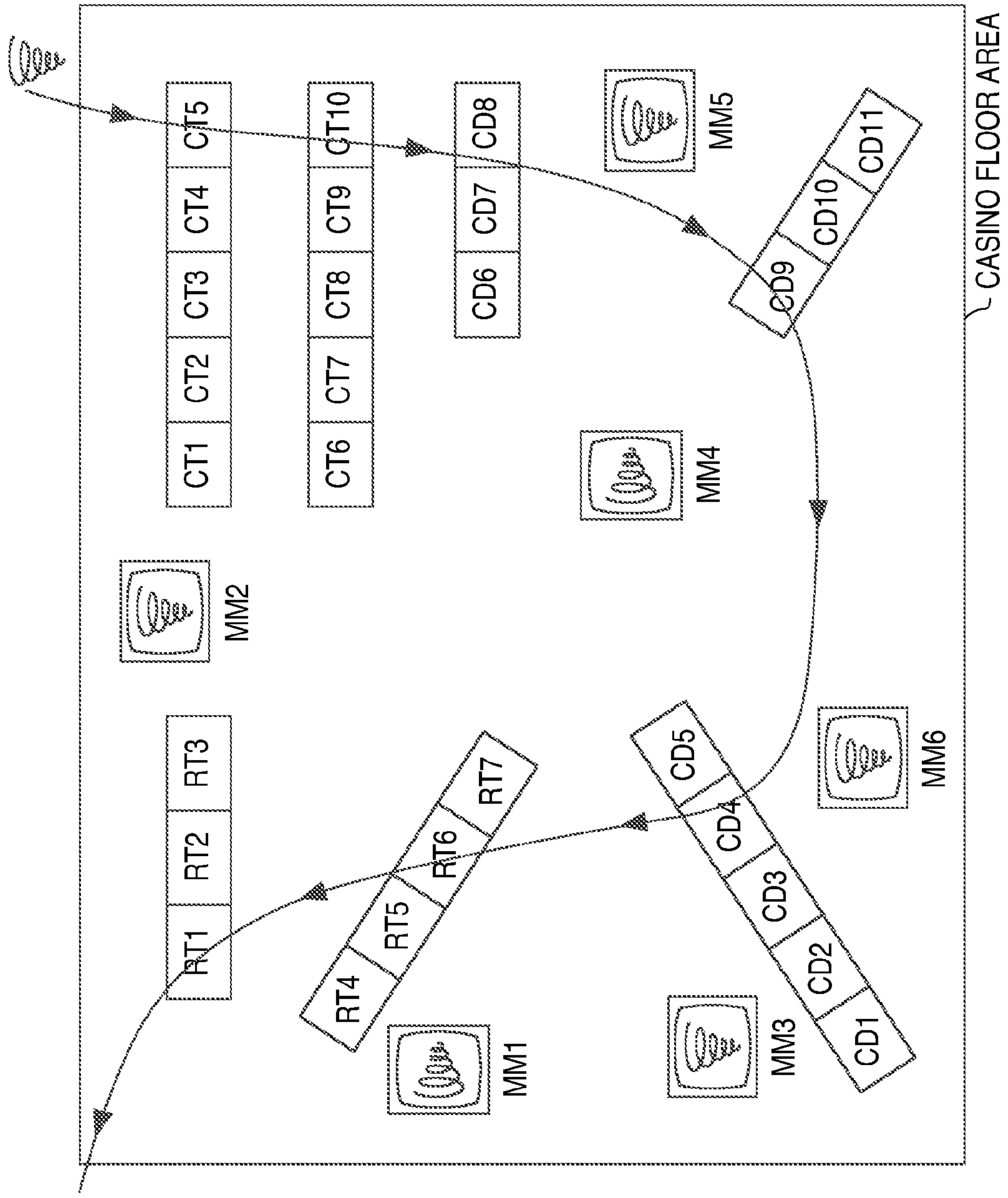
FIG. 8 is a simulation of a tornado moving along a specific pattern through a casino.

Having captured the players' attention with the right type of publicity via the multimedia units MM, simulations can be run using the multimedia units of a tornado entering the casino and taking a specific path through the casino as shown by FIG. 8. The route of the tornado through the casino and, for example its wind speed, can be configured in advance by the casino management, or can be generated by a suitable pattern generator 98. As part of the event, the casino can suggest to the players that those playing at locations through which the tornado moves, i.e. at which the tornado strikes, will have a significantly higher possibility of winning the jackpot. Indeed this probability can depend, for example, on the local strength of the simulated tornado, i.e. for example its wind speed at a particular location.

Figure 9:
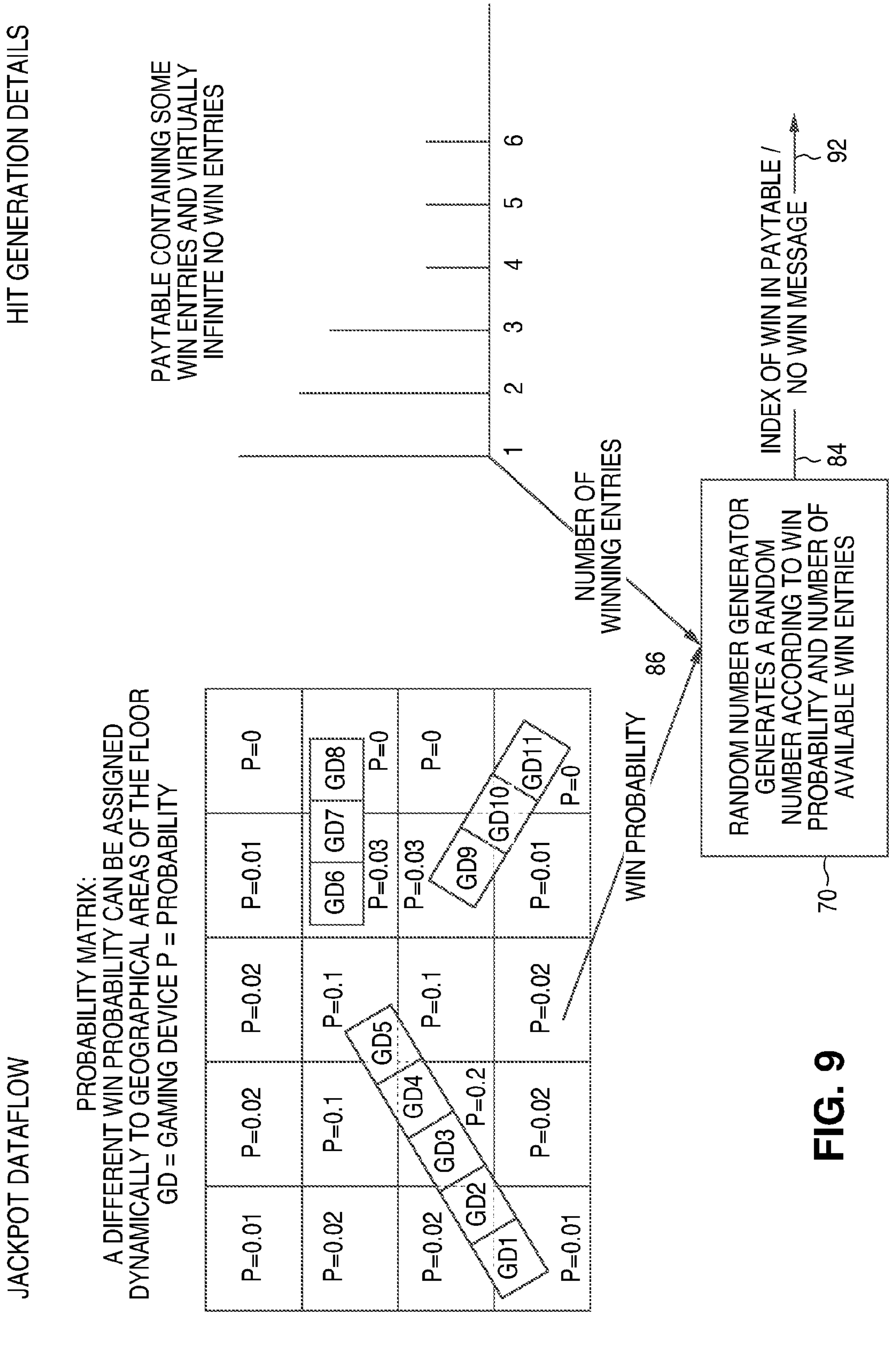
FIG. 9 is a diagram illustrating the use of a probability matrix to modify the possibility of a jackpot win.

By associating a probability matrix with the geographical location of the gaming positions in the casino, for example as shown in FIG. 9, a different win probability can be assigned dynamically to geographical areas of the floor. In FIGS. 8 and 9, the references GD1 to GD11 refer to individual gaming devices, for example individual slot machines, and these are overlaid on the floor area (conceptually) by a probability matrix assigning different win possibilities to different geographical areas of the floor. Thus, if a game is being played on the machine GD1, then the majority of the space occupied by a machine GD1 falls within the unit of the probability matrix at the bottom left in FIG. 9, where the win probability is 0.01. That is to say, if the player playing at the gaming machine GD1 generates a trigger signal during the time at which the tornado is present at this location, then the range of numbers generated by the random number generator is changed so that the player has a probability of 1:100 of winning the jackpot, or of winning a jackpot prize.

Taking another example: if the tornado strikes at the position GD6 within a time interval when the player is playing a game which results in a trigger signal 74, then the probability matrix modifies the range of the random number generator so that the player has a probability of 0.03 of winning the jackpot or a jackpot prize, i.e. a chance of 3:100. The same probability applies to the player at the machine GD7, whereas the player at the machine GD8 has virtually no chance of winning, since the probability associated with this square of the probability matrix is zero.

The paytable to the right of the probability matrix in FIG. 9 resembles that of FIG. 7 and it also provides an input to the random number generator 70 (via the hit generation unit 26), because, in order to ensure the probability of winning corresponds with the values in the probability matrix, the random number generator must also take account of the number of winning entries which could give rise to a win.

Once the simulated tornado has passed through the casino, the wins of the players can be calculated, i.e. the wins which result from the event. This can be portrayed to the players, for example as the "damage" to the casino caused by the tornado.

The arrow 84 in FIG. 9 corresponds essentially to the arrow 84 in FIG. 5, i.e. the feedback to the hit generation unit which determines whether the game of chance represented by the triggering of the random number generator has been won or lost.

Thus, the staging of a special event can be simulated within the casino and can be used to promote excitement and interest. On the one hand, such events can attract patrons from other casinos to the casino having the facilities for such excitement. On the other hand, the players' interest in playing games can be promoted, in particular—but not necessarily—exclusively, during otherwise slack periods of the day.

It should be stressed that the tornado is just one example of an event which a casino management might choose as an event.

In addition to tornadoes, the casino management could for example choose a hurricane or simply winds which gust at certain points at certain times. Many other natural phenomena could also be used as the basis for an event, for example a tidal wave or a volcanic eruption. Equally, the events selected need have nothing to do with natural phenomena but could, for example, be related to a piece of music played by a band or a musician wandering through the casino, with increased jackpot chances being allotted whenever the music reaches a climax. Equally, the event simulated could be a ride in an air balloon, with the air balloon taking a particular track through the casino, and with jackpot chances being increased, via the probability matrix, whenever it is necessary for the crew to ignite fuel to gain height or to take advantage of a landing opportunity.

Many other simulated events can also be used as a basis for the increasing of the jackpot chances, such as for example a golfing contest where the golf ball lands on a particular gaming position. The point is that the jackpot system of the present invention provides the casino management with a highly flexible tool for the configuration of the jackpot system so that they can run any such event and can configure the chances of winning the jackpot accordingly.

Figure 6:
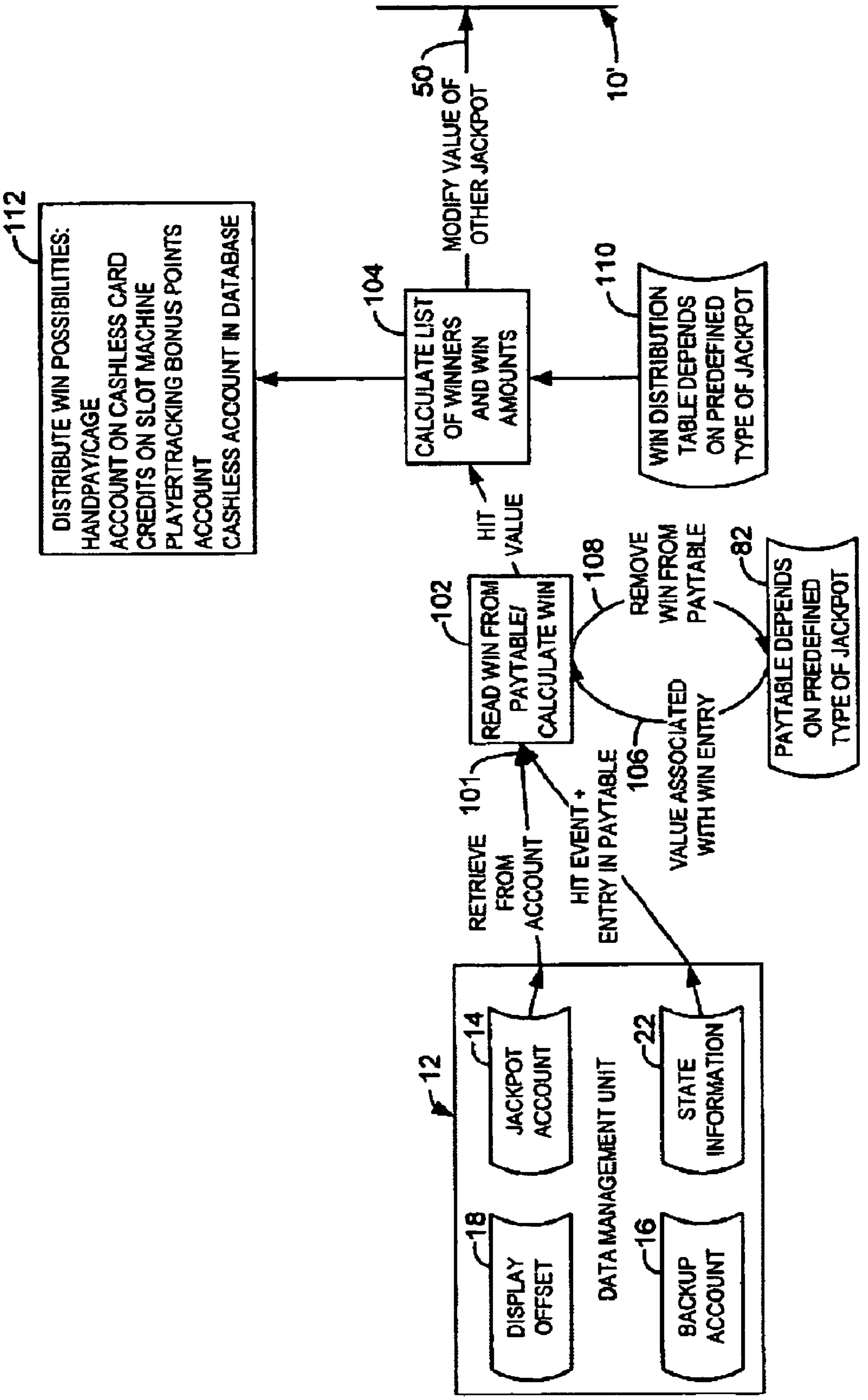

Turning now to FIG. 6, the way the win is allocated and handled in the jackpot system 10 will now be described. Once again, box 12 shows the data management unit. In the event of a win, this win will be paid from the jackpot account, box 14, and the state information relating to the event which triggered the hit and the entry in the paytable provides the instruction to a software routine indicated by box 102 to read the specific win from the paytable 82, or to calculate the win if this is appropriate, and then to retrieve the corresponding amount from the jackpot account 14 as indicated by arrow 101. Clearly the retrieval of the amount from the jackpot account 14 has to result in a reduction of the content of the jackpot, which can be either financial if a monetary win is envisaged or can be a reduction in the number of cars stored in the jackpot, should a car have been won. Having established the hit value from the paytable and modified the jackpot account accordingly, this signal is sent to another subroutine 104, which calculates which player or players have won. The double arrows 106, 108 extending between the paytable of box 82 and the box 102 indicate that the information concerned with the value associated with a win entry is taken from the paytable and that the win has been removed from the paytable, so that the paytable is always up to date.

It will be appreciated that the arrows 106 and 108 essentially correspond to the arrows 88 and 90. In both cases they relate to the same communication of information. In the one case this communication takes place through the programming of the hit generation unit, in the other case it takes place through the programming of the win unit. These are just two examples of different ways of carrying out the same task.

The box 104 represents yet another opportunity for the casino management to actively engage in the configuration of the jackpot system.

In some cases it will be decided that the triggering of a jackpot win at a particular gaming position should result in a jackpot payment only to the player at that position. This is one choice available to the casino management. However, the present invention provides a much more flexible approach to the payment of jackpot wins. For example, the casino management could decide that a win should be paid to the player at the gaming position, e.g. a machine which triggered the win, but that subsidiary wins should also be allocated to players at adjacent machines, or to players associated with the same group of people. Equally, it is possible for the casino management to decide that a win on a particular gaming machine should also provoke a subsidiary win for those placing side bets at a particular gaming table or gaming tables. The box 110 thus indicates the configuration possibilities which the casino management has in deciding how a particular jackpot win should be allocated to patrons in the casino, with limits being set on how this is actually done. Again, the computer system is preferably configured such that a menu of choices is offered to the casino management, who can then choose a particular variant and enter weighting data as desired to vary the relative amounts of wins between those participating in a win. The win distribution table can not only result in wins being allocated to players but also to the value of another jackpot 101 being modified.

Once the winner or list of winners has been identified in any particular case, and the amount won associated with each winner, then a decision can be made by the casino management on how to actually transfer the win to the player or players. As indicated by the box 112, a whole variety of possibilities exists for the transfer of wins. One possibility is for money to be handed over to the player or players at the casino cage (in exchange for suitable identification). Another possibility is for payment to be made to a cashless card or to a player account at the casino (the cashless card or player account being uniquely associated with a particular player. If the gaming position involved is a slot machine, then a win can be credited to the slot machine, or, since slot machines sometimes have a payout facility associated with them, a payout can be made directly at the slot machine. For some wins it may be appropriate to add bonus points (constituting the win) to a player tracking account, if such a system is operated by the casino. Equally, wins can be credited to a cashless account in the casino database maintained for the particular player or players involved.

In the case of more major wins, such as for example a motorcar or a holiday, arrangements may be made to present the win to the winner, i.e. to transfer the win, in a special ceremony, promoting the patrons' interest in the casino and motivating patrons to actively participate in the gaming.

Although the hit generation unit 26 of the present invention has been described with reference to a paytable having winning entries and a random number generator, it should be stressed that this is just one form of selection generator which could be used in the context of the present invention. There are, however, other possibilities. For example, a random number generator could be used to generate a series of random numbers, each of which constitutes a winning entry and is associated with one or more wins. A counter 70' could then be used as shown in FIG. 10, which is incremented each time a trigger signal 74 is received at the hit generation unit 26'.

Figure 10:
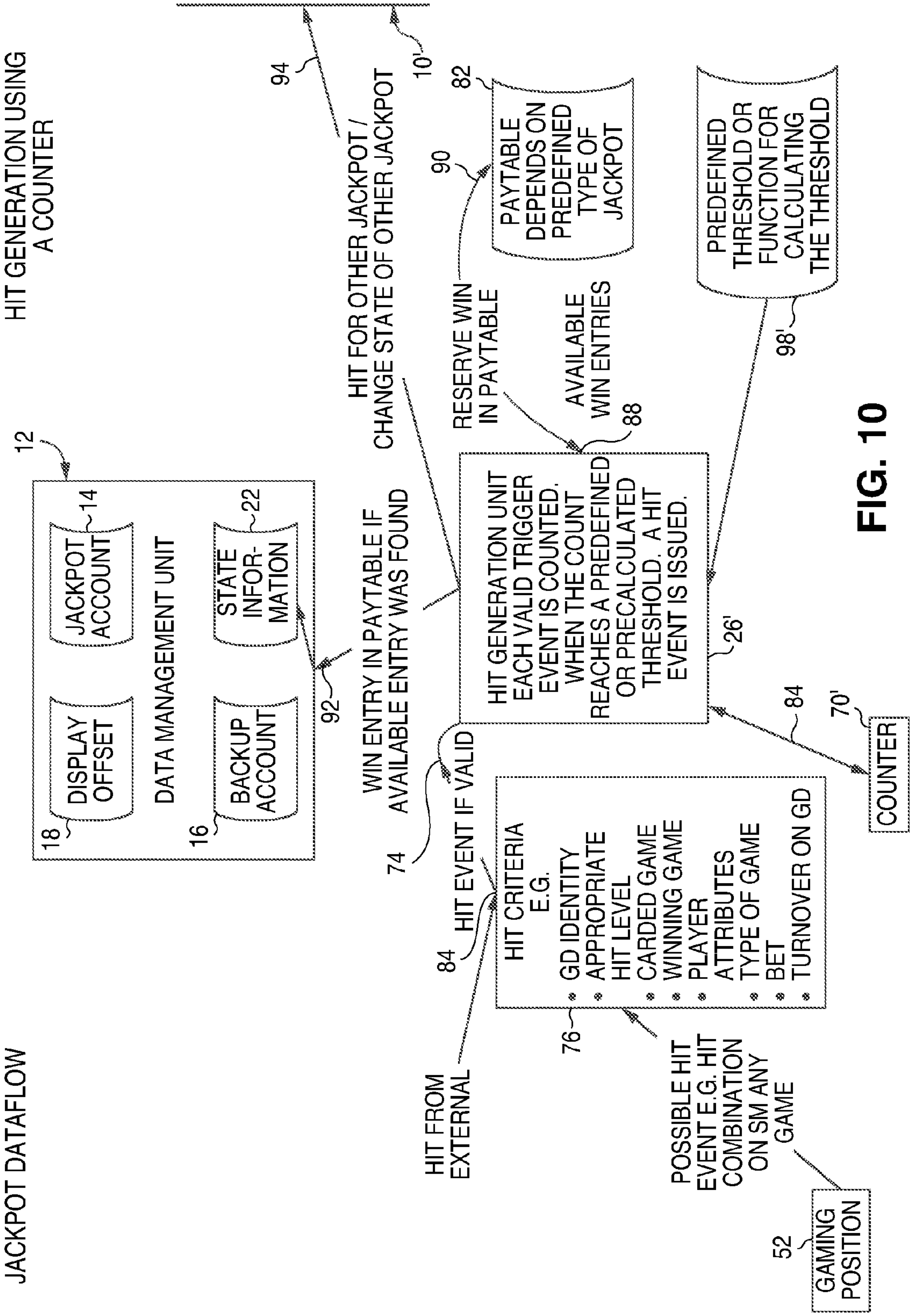
FIG. 10 is a diagram illustrating another way of realizing the present invention.

It will be noted that the arrangement of FIG. 10 is very similar to that of FIG. 5 which is why the same reference numerals have been used for items to which the same description applies as in FIG. 5. Accordingly, the description of FIG. 5 will be understood to apply equally to FIG. 10 unless something to the contrary is stated.

Thus, in accordance with FIG. 10, each time a trigger signal arrives at the hit generation unit 26' it is passed on, in accordance with the double arrow 84 to the counter 70' which increments its count by one. The incremented count is then passed back to the hit generation unit 26', in accordance with the double arrow 84, and is compared there with a list of random numbers generated by the box labeled 98' in FIG. 10. If a match is found between the count of counter 70' and one of the random numbers in the list, then a hit is generated and a prize associated with that random number is won by the player at the gaming position which triggered the counter, in accordance with the rules predetermined by the casino management. That is to say, it is not necessarily the single player at the gaming position 52 who wins the prize, but it could be shared between a group of players according to predetermined criteria as has previously been described.

The arrows 88 and 90 show how the hit generation unit 26' interrogates the paytable 82 which lists the prizes available against the random numbers associated with them in order to obtain the information as to which prize the player at the relevant gaming position 52 has won. The arrow 94 again signifies a hit generated in the jackpot system and this consideration can also be used to trigger an entry into another jackpot 10', again as previously described.

Generally speaking, using the system of FIG. 10, the random number generation in the box 98' will be conducted before play for the jackpot commences, since triggering of hits once the count reaches a particular random number implies either that the random numbers have been decided in advance or that the range within which random numbers can be generated has to be continually adapted to the level of the count. This latter possibility is however unnecessarily complicated and it is simpler to operate in accordance with the scheme FIG. 5 from the outset.

Because the box 98' generates random numbers in advance of operation of the jackpot, the casino can decide precisely when it will allow the jackpot to come into operation. For example, the random number generation in the box 98' could produce the number 10 meaning that the tenth player at one of the gaming positions will win the jackpot. This is probably not in the casino's interest and therefore the casino can review the random numbers produced by this random number generator in box 98' and, for example, precludes all very low numbers so that the jackpot is not won too early within its lifetime. Equally, the casino may decide that it is not in its interest for the jackpot to go on for a long time without being won and can thus preclude higher numbers.

It is not necessary for the software included in the subroutine of box 98' to be configured as a random number generator. In fact, the casino management could simply choose from the outset which numbers are to be associated with wins and which wins are associated with each winning number. This is yet another example of parameter which can be selected by the casino management. The system has sufficient built-in randomness due to the fact that it is not possible to predict precisely which hit event triggering the counter will lead to the jackpot being won. For this reason, the software in box 98' can simply be considered as a software which defines predetermined thresholds or functions for calculating thresholds, i.e. threshold values which correspond to a hit event. Thus, the casino has a great deal of flexibility in defining the thresholds or functions for calculating the thresholds in box 98' which give rise a hit, thus emphasizing the flexibility given to the casino for jackpot generation using the system of FIG. 10.

Thus, in accordance with FIG. 10, once the counter 70' reaches a random number or a predefined number (threshold) associated with a winning entry, then a win 92 is triggered. The size of that win is determined by the prize associated with the winning number.

After this win has been paid out, the counter 70' can be allowed to continue counting until it reaches the next random number representing a winning entry, when a game hit again occurs and a win is allocated.

Rules can be provided enabling the casino operator to decide when the counter will be reset so that a random number representing a winning associated with more than one win can be reached again by the counter. Alternatively, with a system of this kind, it may be more convenient to have a situation where only one win is associated with each winning entry. Moreover, the association of wins or winning entries need not be fixed, but rather the casino management could be given, as a further configuration possibility, the opportunity to vary the association of wins with winning entries according to a predetermined or random strategy.

There are undoubtedly other ways of realizing a selection or result generator suitable for use in the present invention, other than the preferred random number generator and paytable arrangement described above in connection with FIG. 5, and also other than the paytable and counter arrangement just described with reference to FIG. 10.

It will be appreciated that the examples given in the specification are merely by way of example and that, for example, numbers of winning entries, prizes and ranges for the random number generator have only been quoted in order to facilitate an understanding of the invention. The precise values selected for any of these parameters lie within the range of the configuration which can be made available to the casino management by the present invention.

Basically the present invention provides a highly flexible system for the casino management to configure any desired jackpot system and any number of desired jackpot systems as well as any desired relationships between them.

Moreover, the possibility of determining in advance the course of an event means that the cost of an event to the casino can be simulated and therefore its financial impact of the casino assessed. This again provides the casino management with increased flexibility, since they can determine in advance precisely how they wish to arrange an event to maximize the benefit to a casino while minimizing the actual cost to the casino.

Clearly from a programming standpoint all elements of data need only be input once into the system and various parts of the program using such data elements can access the information accordingly. E.g., if a player card is used as a criterion for both the decision as to whether the player can participate in a particular jackpot and for determining the probability of him winning a the jackpot then the relevant data is available to the system as soon as the player enters his player card in the relevant card slot at the gaming position.

Thus, generally speaking, the system as described above, i.e. for example in accordance with FIG. 5 or FIG. 10, provide a jackpot system for the allocation of wins from at least one jackpot 10, 10' to players playing at a plurality of gaming positions such as 52. These gaming positions 52 are associated with a computer network, which can include a centralized computing engine or a distributed computing engine—meaning that various different computers are interlinked to make up the complete system. Irrespective of whether a centralized or distributed computing engine is used, the system will have means for receiving, storing and processing inputs from the gaming positions 52 and will have at least one output for communicating information to the players. This output for communicating information to the players comprises, in FIG. 5, the arrow 92 leading to the data management unit 12 which results in outputs in accordance with arrow 32 to the multimedia units 34 which are ultimately responsible for advising players in the casino that various jackpot prizes have been won.

Equally, the distribution of the win to individual players (in accordance with box 112 of FIG. 6) can also be considered to be an output for communicating information to the players.

Irrespective of whether the system in accordance with FIG. 5 or of a system in accordance with FIG. 10 is used, it can be considered to include at least one parameterizable win determination unit including at least one associated game of chance having rules and parameters relating to the rules and associated to the wins. Thus, in the system of FIG. 5, the hit generation unit 26 with the associated software routines forms a parameterizable win determination unit which includes at least one associated game of chance. In the FIG. 5 embodiment the associated game of chance is a random number game, that is played each time the random number generator 70 is triggered (as symbolized by the arrow 74 and the double arrow 84) to generate a random number. The rules of this game of chance are very simple. The hit generation unit 26 simply has to see whether the random number it generates corresponds to a random number associated with a win and to check the win associated with that random number, taking account of rules that the casino has specified for the payment of the win to one or more competitors. Thus, the rules and parameters relating to the game of chance are contained in the subroutines listed in boxes 72, 96 and 82. The casino has the facility to vary the rules and parameters relating to the rules and associated wins by selecting appropriate choices typically offered to the casino operator as a menu on a computer screen. The box 98 also represents a way of modifying the rules and parameters of a special game of chance, namely, in the example given, a jackpot win associated with a tornado moving through the casino.

Equally, the box 76 provides the casino operator with the opportunity to select which plays at which gaming positions of which category of players will be accepted for one or more plays at the game of chance.

Clearly, the parameters which have been adopted by the casino management for the rules of the game of chance are all stored in the computer system, either in a central memory or in distributed memory elements around the computer system.

Thus, the win determination unit 26 is capable of triggering a play at the game of chance for each corresponding trigger input, which can come from any gaming position 52 or from a central unit or elsewhere, for example if the casino management has decided to allow an unlucky player who has lost a substantial sum of money to participate in a jackpot game. The playing of the game of chance will generate a result.

The jackpot system then includes a comparator, again usually realized as an element of software, but also potentially realizable as a unit of hardware, for comparing the result generated by a player at the game of chance with the rules of the game, for example information setting up the winning numbers, and, in the event of the results generated corresponding to a winning result, the comparator then initiates the transfer of the associated win to one or more players at or associated with the gaming position which triggered the winning result. Moreover, the rules of the game can be set up such that part of the associated win is transferred to another jackpot.

It will be appreciated that the same basic description also applies to the system of FIG. 10. Here, the game of chance comprises the comparison of the count of the counter with a predefined list of winning numbers which may be random numbers. The result is the count of the counter and the comparator operates to compare this result with the list of random numbers to see whether the result generated by the counter corresponds to a winning result. If so, then the jackpot system again initiates the transfer of the associated win to one or more players at or associated with the gaming position which triggered the winning result and can also apportion part of the win to another jackpot.

What is claimed is:

1. A gaming method performed in a system of a plurality of gaming machines connected in a network comprising:

accumulating a visible jackpot, visible to players, common to the plurality of gaming machines;

accumulating an invisible jackpot, not visible to players, common to the plurality of gaming machines;

paying the visible jackpot to one of the plurality of gaming machines meeting certain criteria; and at least partially replenishing the visible jackpot using at least a portion of the invisible jackpot, wherein an amount of the invisible jackpot used to replenish the visible jackpot is less than 100% of the invisible jackpot and is calculated based on an amount in the invisible jackpot.

2. The gaming method of claim 1 wherein the certain criteria comprise an occurrence of when an amount of the visible jackpot reaches a certain level.

3. The gaming method of claim 1 wherein the certain criteria comprise a number of plays of the plurality of gaming machines.

4. The gaming method of claim 1 wherein the certain criteria comprise a certain symbol combination obtained by one of the plurality of gaming machines.

5. The gaming method of claim 1 further comprising:

displaying the visible jackpot on a display device.

6. The gaming method of claim 5 wherein the display device is common to more than one gaming machine in the plurality of gaming machines.

7. The gaming method of claim 5 wherein the display device is incorporated into each of said gaming machines.

8. The gaming method of claim 1 wherein accumulating a visible jackpot comprises increasing an amount of the visible jackpot by a first percentage of each bet placed on the plurality of gaming machines.

9. A gaming method performed in a system of a plurality of gaming machines connected in a network comprising:

accumulating a visible jackpot, visible to players, common to the plurality of gaming machines;

accumulating an invisible jackpot, not visible to players, common to the plurality of gaming machines;

paying the visible jackpot to one of the plurality of gaming machines meeting certain criteria; and at least partially replenishing the visible jackpot using at least a portion of the invisible jackpot, wherein the certain criteria comprise an amount of the invisible jackpot.

10. A gaming method performed in a system of a plurality of gaming machines connected in a network comprising:

accumulating a visible jackpot, visible to players, common to the plurality of gaming machines;

accumulating an invisible jackpot, not visible to players, common to the plurality of gaming machines;

paying the visible jackpot to one of the plurality of gaming machines meeting certain criteria; and at least partially replenishing the visible jackpot using at least a portion of the invisible jackpot, wherein accumulating a visible jackpot comprises increasing an amount of the visible jackpot by a first percentage of each bet placed on the plurality of gaming machines, wherein accumulating an invisible jackpot comprises increasing an amount of the invisible jackpot by a second percentage of each bet placed on the plurality of gaming machines, wherein the second percentage is greater than the first percentage.

11. The gaming method of claim 10 wherein the second percentage is twice the first percentage.

12. The gaming system of claim 10 wherein the certain criteria comprise an amount of the visible jackpot.

13. A gaming system comprising:

a plurality of gaming machines connected within a network;

a computer connected to the network, the computer comprising instructions for:

accumulating a visible jackpot common to the plurality of gaming machines;

accumulating an invisible jackpot common to the plurality of gaming machines;

paying the visible jackpot to one of the plurality of gaming machines meeting a certain criteria; and after paying the visible jackpot, at least partially replenishing the visible jackpot using at least a portion of the invisible jackpot; and a display device connected to the network that displays the visible jackpot, wherein the computer further comprises instructions for calculating an amount of the invisible jackpot used to replenish the visible jackpot based on a total amount in the invisible jackpot, where the amount of the invisible jackpot used to replenish the visible jackpot is less than 100% of the invisible jackpot.

14. A gaming system comprising:

a plurality of gaming machines connected within a network;

a computer connected to the network, the computer comprising instructions for:

accumulating a visible jackpot common to the plurality of gaming machines;

accumulating an invisible jackpot common to the plurality of gaming machines;

paying the visible jackpot to one of the plurality of gaming machines meeting a certain criteria; and after paying the visible jackpot, at least partially replenishing the visible jackpot using at least a portion of the invisible jackpot; and a display device connected to the network that displays the visible jackpot, wherein the computer further comprises instructions for determining a new certain criteria based on an amount used to replenish the visible jackpot.

15. The gaming system of claim 14 wherein accumulating a visible jackpot comprises increasing an amount of the visible jackpot by a first percentage of each bet placed on the plurality of gaming machines.

16. A gaming system comprising:

a plurality of gaming machines connected within a network;

a computer connected to the network, the computer comprising instructions for:

accumulating a visible jackpot common to the plurality of gaming machines;

accumulating an invisible jackpot common to the plurality of gaming machines;

paying the visible jackpot to one of the plurality of gaming machines meeting a certain criteria; and after paying the visible jackpot, at least partially replenishing the visible jackpot using at least a portion of the invisible jackpot; and a display device connected to the network that displays the visible jackpot, wherein accumulating a visible jackpot comprises increasing an amount of the visible jackpot by a first percentage of each bet placed on the plurality of gaming machines, wherein accumulating an invisible jackpot comprises increasing an amount of the invisible jackpot by a second percentage of each bet placed on the plurality of gaming machines, wherein the second percentage is greater than the first percentage.

17. The gaming system of claim 16 further comprising a display for displaying the visible jackpot to one or more players.

18. A gaming method performed in a system of a plurality of gaming machines connected in a network comprising:

accumulating a first visible jackpot, visible to players, common to the plurality of gaming machines;

accumulating a first invisible jackpot, not visible to players, common to the plurality of gaming machines;

accumulating a second jackpot common to the plurality of gaming machines;

paying the first visible jackpot to one of the plurality of gaming machines meeting first certain criteria; and at least partially replenishing the first visible jackpot using at least a portion of the first invisible jackpot, further comprising selecting the first invisible jackpot at random to at least partly replenish the first visible jackpot.

19. A gaming method performed in a system of a plurality of gaming machines connected in a network comprising:

accumulating a first visible jackpot, visible to players, common to the plurality of gaming machines;

accumulating a first invisible jackpot, not visible to players, common to the plurality of gaming machines;

accumulating a second jackpot common to the plurality of gaming machines;

paying the first visible jackpot to one of the plurality of gaming machines meeting first certain criteria; and at least partially replenishing the first visible jackpot using at least a portion of the first invisible jackpot, further comprising filling the first invisible jackpot at a rate faster than the rate at which the first visible jackpot is filled.

* * * * *